United States Patent
Kawai et al.

(10) Patent No.: US 8,058,365 B2
(45) Date of Patent: Nov. 15, 2011

(54) PROTON CONDUCTING MEMBRANE AND PROCESS FOR PRODUCING THE SAME

(75) Inventors: Junji Kawai, Tokyo (JP); Yosuke Konno, Tokyo (JP); Kohei Goto, Tokyo (JP)

(73) Assignee: JSR Corporation, Tokyo (JP)

(*) Notice: Subject to any disclaimer, the term of this patent is extended or adjusted under 35 U.S.C. 154(b) by 1258 days.

(21) Appl. No.: 10/582,080

(22) PCT Filed: Dec. 8, 2004

(86) PCT No.: PCT/JP2004/018290
§ 371 (c)(1),
(2), (4) Date: Jun. 8, 2006

(87) PCT Pub. No.: WO2005/056649
PCT Pub. Date: Jun. 23, 2005

(65) Prior Publication Data
US 2007/0117872 A1  May 24, 2007

(30) Foreign Application Priority Data
Dec. 9, 2003  (JP) ................ 2003-410667

(51) Int. Cl.
 *C08F 283/08* (2006.01)
 *C08G 61/10* (2006.01)
(52) U.S. Cl. .......... 525/535; 525/332.4; 525/288; 525/291; 528/86; 528/171; 528/255; 528/219; 528/373
(58) Field of Classification Search .......... 521/27, 521/25; 429/33, 46; 525/535, 332.4, 288, 525/291; 528/86, 171, 255, 219, 373
See application file for complete search history.

(56) References Cited

U.S. PATENT DOCUMENTS

| 7,163,988 B2* | 1/2007 | Rozhanskii et al. ......... 525/535 |
| 7,348,089 B2* | 3/2008 | Okada et al. ............... 429/33 |
| 2002/0091225 A1* | 7/2002 | McGrath et al. ............ 528/170 |

FOREIGN PATENT DOCUMENTS

| EP | 1 245 554 A1 | 10/2002 |
| EP | 1 274 147 A2 | 1/2003 |
| EP | 1 479 714 A1 | 11/2004 |
| EP | 1479714 A1 * | 11/2004 |
| JP | 02 000159 | 1/1990 |

(Continued)

OTHER PUBLICATIONS

Kobayashi, Takeshi et al., "Preparation of Thermaly Stable Proton Conducting Polymer", Polymer Preprints, vol. 42, No. 3, pp. 730-731, 1993. (With English Translation).

(Continued)

*Primary Examiner* — Michael M Bernshteyn
(74) *Attorney, Agent, or Firm* — Oblon, Spivak, McClelland, Maier & Neustadt, L.L.P.

(57) ABSTRACT

A proton conductive membrane displays sufficient proton conductivity even at low humidities and low temperatures. The proton conductive membrane includes:
 a block copolymer including an ion conductive polymer segment (A) and an ion nonconductive polymer segment (B), the segment (A) and the segment (B) being covalently bound in a manner such that main chain skeletons of the segments are covalently bound at aromatic rings thereof through binding groups,
 (i) the membrane having a morphology including a microphase separated structure,
 (ii) the ion conductive polymer segment (A) forming a continuous phase.

20 Claims, 1 Drawing Sheet

Polymer segment(B) without ion conductive groups

5  Polymer segment(A) with ion conductive groups

FOREIGN PATENT DOCUMENTS

| | | |
|---|---|---|
| JP | 2001-250567 | 9/2001 |
| JP | 2003-17090 | 1/2003 |
| JP | 2003-142125 | 5/2003 |
| JP | 2003-317749 | 11/2003 |
| JP | 2004-175997 | 6/2004 |
| JP | 2005-197236 | 7/2005 |
| WO | 95/32236 | 11/1995 |
| WO | WO 99/29763 | 6/1999 |
| WO | 02/080294 | 10/2002 |
| WO | 02/101860 | 12/2002 |

OTHER PUBLICATIONS

Kobayashi, Takeshi et al.,"Preparation of Thermaly Stable Proton Conducting Polymer", Polymer Preprints, vol. 43, No. 3, pp. 736-737, 1994. (With English Translation).

Kobayashi, Takeshi et al.,"Preparation of Thermaly Stable Proton Conducting Polymer", Polymer Preprints, vol. 42, No. 7, pp. 2490-2492, 1993. (With English Translation).

Bates, Frank S,"Block Copolymer Thermodynamics", Annual Review of Physical Chemistry, vol. 41, pp. 525-557, 1990.

Fedors, Robert F.,"A Method for Estimating Both the Solubility Parameters and Molar Volumes of Liquids", Polymer Engineering and Science, vol. 14, No. 2, pp. 147-154, 1974.

U.S. Appl. No. 10/582,518, filed Jun. 9, 2006, Kawai, et al.

Office Action issued Apr. 5, 2011, in Japanese Patent Application No. 2004-355675.

* cited by examiner

Polymer segment(B) without ion conductive groups

5   Polymer segment(A) with ion conductive groups

PROTON CONDUCTING MEMBRANE AND PROCESS FOR PRODUCING THE SAME

FIELD OF THE INVENTION

The present invention relates to a proton conductive membrane suitable for use as electrolytes in solid polymer fuel cells. More particularly, the invention concerns a proton conductive membrane suitable as electrolytes in hydrogen powered fuel cells for vehicles, and a process for producing the same.

BACKGROUND ART

A fuel cell essentially consists of two catalyst electrodes and a solid electrolyte membrane sandwiched between the electrodes. Hydrogen, the fuel, is ionized at one of the electrodes, and the hydrogen ions diffuse through the solid electrolyte membrane and combine with oxygen at the other electrode. When the two electrodes are connected through an external circuit, an electric current flows and electric power is supplied to the external circuit. Here, the solid electrolyte membrane has functions to diffuse the hydrogen ions, as well as to physically isolate the fuel gas (hydrogen) and oxygen and to block the flow of electrons.

DISCLOSURE OF THE INVENTION

Problems to be Solved by the Invention

It is accepted that the solid electrolyte membranes diffuse hydrogen ions through water clusters in hydrophilic channels (ion conducting channels). Therefore, the ion conductivity drastically lowers at low humidities by drying of water and at low temperatures by freezing of water.

The quantity of water adsorbed and bound to ion conductive groups in the membrane and the channel structure formed by the ion conductive groups are considered very important for the ion conductivity.

Block copolymers in which two or more incompatible polymers (block chains) are covalently bound into one polymer chain permit nanometer scale control of arrangement of the chemically different components. In block copolymers, chemically different block chains repel each other to produce short-range interaction which causes the block chains to be separated into respective phases (microdomains). When the block chains are covalently bound, long-range interaction is produced to arrange the microdomains in certain order. The microdomains of block chains gather to make a structure called the microphase separated structure.

Ion conductive membranes of block copolymers are generally fabricated by spreading a solution of the block copolymer in an organic solvent on an appropriate substrate and removing the solvent. The microphase separated structures in the membranes are crystalline structures such as spherical micelle structure, cylindrical structure and lamella structure depending on the composition of constituent components and atmosphere, as disclosed in Annu. Res. Phys. Chem. 1990 (41) 525 (Bates F. S. and Fredrickson G. H.) (Nonpatent Document 1). When the microphase separated structure is controlled by the composition of constituent components, membrane properties are greatly influenced not only by factors of the phase separated structure but by changes of the constituent components.

Nonpatent Document 1: Annu. Res. Phys. Chem. 1990 (41) 525 (Bates F. S. and Fredrickson G. H.)

Means for Solving the Problems

The present inventors studied in view of the above problems in the background art and have arrived at a solid polymer electrolyte membrane that comprises a block copolymer comprising an ion conductive polymer segment (A) and an ion nonconductive polymer segment (B), the segment (A) and the segment (B) being covalently bound in a manner such that main chain skeletons making up the copolymer are covalently bound at aromatic rings thereof through binding groups, wherein (i) the membrane has a morphology including a microphase separated structure and (ii) the segment (A) forms a continuous phase, whereby ion conductive groups are arranged through the membrane and can adsorb and bind thereto increased amounts of water, and consequently water is prevented from drying at low humidities and from freezing at low temperatures and the membrane can achieve sufficient proton conductivity even at low humidities and low temperatures.

The present inventors have also found that in fabricating the proton conductive membrane, an organic solvent that is not interactive with the ion conductive polymer segment (A) may be used as a casting solvent for dissolving the copolymer, whereby the spatial arrangement of the ion conductive groups in the membrane can be easily controlled and the ion conductive polymer segment (A) forms a continuous phase in the solid polymer electrolyte membrane. The present invention has been completed based on the findings.

The proton conductive membrane and production thereof according to the present invention are as follows.

(1) A proton conductive membrane comprising:

a block copolymer comprising an ion conductive polymer segment (A) and an ion nonconductive polymer segment (B), the segment (A) and the segment (B) being covalently bound in a manner such that main chain skeletons of the segments are covalently bound at aromatic rings thereof through binding groups, (i) the membrane having a morphology including a microphase separated structure, (ii) the ion conductive polymer segment (A) forming a continuous phase.

(2) The block copolymer includes the polymer segments (A) and (B) that comprise repeating structural units represented by Formulae (A) and (B), respectively:

[Chem. 1]

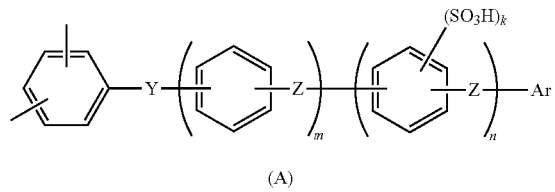

(A)

wherein Y is a divalent electron-withdrawing group; Z is a divalent electron-donating group or a direct bond; Ar is an aromatic group having a substituent —$SO_3H$; m is an integer ranging from 0 to 10; n is an integer ranging from 0 to 10; and k is an integer ranging from 1 to 4;

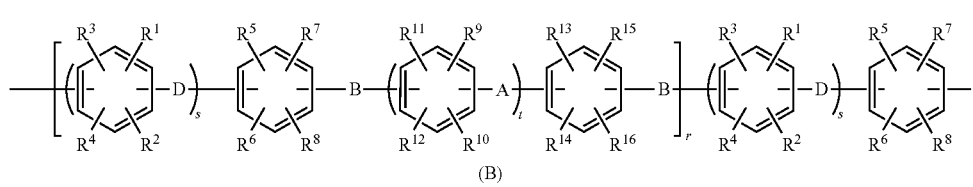

(B)

wherein A and D are each a direct bond or at least one structure selected from the group consisting of —Co—, —SO$_2$—, —SO—, —CONH—, —COO—, —(CF$_2$)$_l$— (where l is an integer ranging from 1 to 10), —(CH$_2$)$_l$— (where l is an integer ranging from 1 to 10), —C(R')$_2$— (where R' is an alkyl group, a fluoroalkyl group or an aryl group), —O—, —S—, cyclohexylidene group and fluorenylidene group; B's are each an oxygen or a sulfur atom; R$^1$ to R$^{16}$ are the same or different from one another and are each at least one atom or group selected from the group consisting of a hydrogen atom, a fluorine atom, alkyl groups, partially or fully halogenated alkyl groups, allyl groups, aryl groups, nitro group and nitrile group; s and t are the same or different and are each an integer ranging from 0 to 4; and r is an integer of 0 or 1 or greater.

(3) The ion conductive polymer segment has a sulfonic acid group.

(4) A process for producing the above proton conductive membrane, comprising dissolving a block copolymer in a casting solvent, the block copolymer comprising an ion conductive polymer segment (A) and an ion nonconductive polymer segment (B) that are covalently bound to each other, casting the solution over a substrate, and drying, the casting solvent containing at least 30% by weight of an organic solvent that is not interactive with the ion conductive polymer segment (A).

(5) The process for producing the proton conductive membrane as described above, wherein the organic solvent that is not interactive with the ion conductive polymer segment (A) (i) does not contain a nitrogen-containing substituent in which the nitrogen atom is bonded by a single bond or a double bond, and (ii) contains at least one group selected from the group consisting of —O—, —OH, —CO—, —SO$_2$—, —SO$_3$—, —CN and —COOR (where R is a hydrogen atom, a hydrocarbon group or a salt).

Effect of the Invention

The proton conductive membrane according to the present invention can achieve sufficient proton conductivity even at low humidities and low temperatures.

DESCRIPTION OF THE PREFERRED EMBODIMENTS

Figure 1:
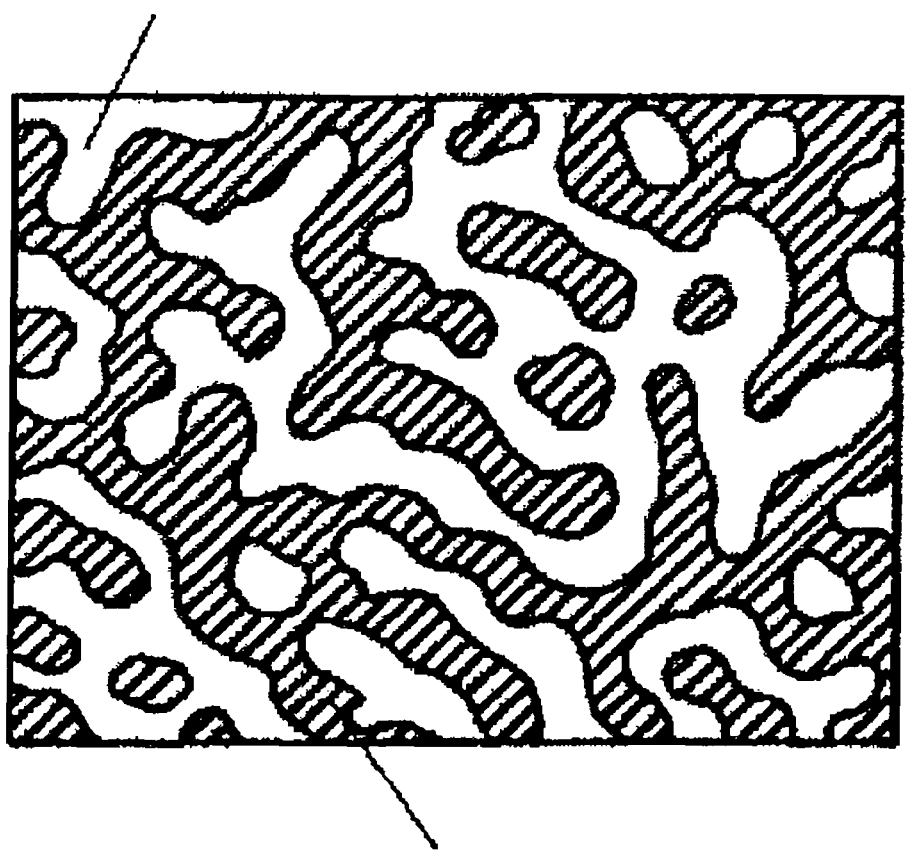
FIG. 1 is a schematic sectional view showing a morphology of an ion conductive membrane fabricated in Example 1.

The proton conductive membrane and production thereof according to the present invention will be described in detail hereinbelow.
(Morphology)
The proton conductive membrane of the invention comprises a block copolymer comprising an ion conductive polymer segment (A) and an ion nonconductive polymer segment (B) that are covalently bound in a manner such that main chain skeletons of the polymer segments are covalently bound at aromatic rings thereof through binding groups, and (i) the membrane has a morphology including a microphase separated structure, and (ii) the ion conductive polymer segment (A) forms a continuous phase. The copolymer will be described later.

The microphase separated structures are crystalline structures such as spherical micelle structure, cylindrical structure and lamella structure depending on the composition of constituent components and atmosphere, as disclosed in Annu. Res. Phys. Chem. 1990 (41) 525 (Bates F. S. and Fredrickson G. H.) (Nonpatent Document 1). The microphase separated structures are identified by TEM observation. Such microphase separated structures are unstable to heat and easily change into other microphase separated structures when exposed to temperatures not less than the glass transition temperature of the block copolymer.

The ion conductive polymer segment (A) preferably forms an isotropic continuous phase. Also preferably, the ion nonconductive polymer segment (B) forms a non-continuous phase, more preferably a structure similar to a dispersed phase. The long period of the structure is preferably in the range of 1 nm to 200 nm, more preferably 1 nm to 100 nm.

When the ion conductive polymer segment (A) forms a continuous phase, ion conductive groups in the segment (A) are arranged uniformly through the membrane and can adsorb and bind thereto increased amounts of water. Consequently, water is prevented from drying at low humidities and from freezing at low temperatures and the proton conductive membrane can achieve sufficient proton conductivity even at low humidities and low temperatures.

If the ion conductive polymer segment (A) forms a non-continuous phase, the ion conductive groups in the segment (A) are not arranged uniformly through the membrane and allow reduced amounts of water to be adsorbed and bound thereto. Consequently, the proton conductive membrane often fails to achieve sufficient proton conductivity at low humidities and low temperatures.

The continuous phases are confirmed by TEM observation. Examples of the ion conductive groups in the polymer segment (A) include sulfonic acid group, carboxyl group and phosphoric acid group. Of these ion conductive groups, the present invention preferably employs the sulfonic acid group, in which case the membrane can achieve very high proton conductivity.

The proton conductive membrane which has a microphase separated structure and in which the ion conductive polymer segment (A) forms a continuous phase is suitable for use in hydrogen fuel cells for the reasons that the ion conductive groups in the segment (A) are arranged uniformly through the membrane and can adsorb and bind thereto increased amounts of water, and consequently water is prevented from drying at low humidities and from freezing at low temperatures and the membrane can achieve sufficient proton conductivity even at low humidities and low temperatures. Furthermore, the membrane can be reduced in size and weight and is therefore suited for use in vehicle fuel cells.

In the formula, m is an integer of from 0 to 10, preferably from 0 to 2; n is an integer of from 0 to 10, preferably from 0 to 2; and k is an integer of from 1 to 4.

[Chem. 5]

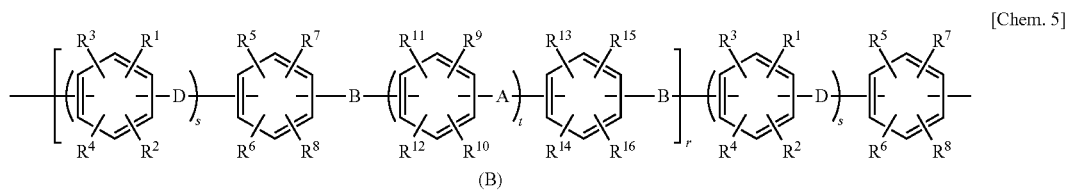

(B)

The block copolymer used in the present invention includes repeating structural units represented by Formulae (A) and (B) which will be given below. Preferably, the copolymer is a block copolymer (polyarylene having a sulfonic acid group) represented by Formula (C) which will be given below. The use of the copolymer represented by Formula (C) leads to increased water resistance and mechanical strength, and also higher ion exchange capacity. Consequently, the ion conductive groups in the segment (A) can adsorb and bind thereto increased amounts of water, and the proton conductivity is enhanced.

(Polyarylene Having a Sulfonic Acid Group)

The polyarylene having a sulfonic acid group will be described in detail.

The polyarylene having a sulfonic acid group includes repeating structural units represented by Formulae (A) and (B) below, and is a polymer, preferably a block copolymer, represented by Formula (C) below.

[Chem. 3]

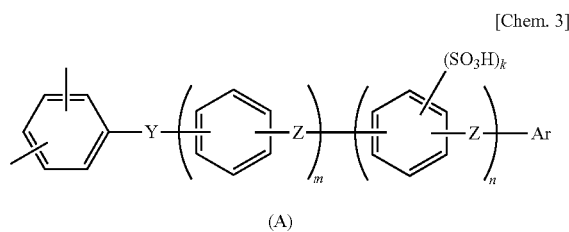

(A)

In the above formula, Y is a divalent electron-withdrawing group such as —CO—, —SO$_2$—, —SO—, —CONH—, —COO—, —(CF$_2$)$_l$— (where l is an integer of from 1 to 10) and —C(CF$_3$)$_2$—; and Z is a direct bond or a divalent electron-donating group such as —(CH$_2$)—, —C(CH$_3$)$_2$—, —O—, —S—, —CH=CH—, —C≡C— and groups represented by:

[Chem. 4]

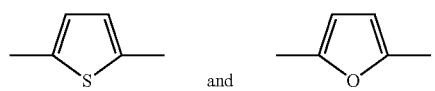

The electron-withdrawing group is defined as having a Hammett substituent constant of not less than 0.06 at the m-position of the phenyl group and not less than 0.01 at the p-position.

Ar denotes an aromatic group with a substituent —SO$_3$H. Exemplary aromatic groups include phenyl, naphthyl, anthracenyl and phenanthyl groups, with phenyl and naphthyl groups being preferred.

In Formula (B), A and D are the same or different and are each a direct bond or at least one structure selected from the group consisting of —CO—, —SO$_2$—, —SO—, —CONH—, —COO—, —(CF$_2$)$_l$— (where l is an integer ranging from 1 to 10), —(CH$_2$)$_l$— (where l is an integer ranging from 1 to 10), —C(R')$_2$— (where R' is an alkyl group, a fluoroalkyl group or an aryl group), —O—, —S—, cyclohexylidene group and fluorenylidene group. Examples of R' in the structure —C(R')$_2$— include alkyl groups such as methyl, ethyl and propyl groups, fluoroalkyl groups such as trifluoromethyl and heptafluoroethyl groups, and aryl groups such as phenyl and naphthyl groups. Specific examples of the structures —C(R')$_2$— include —C(CF$_3$)$_2$—, —C(CH$_3$)$_2$— and —C(C$_6$H$_5$)$_2$—

Of the above structures, direct bond, —CO—, —SO$_2$—, —C(R')$_2$— (where R' is an alkyl, fluoroalkyl or aryl group), —O—, cyclohexylidene group and fluorenylidene group are preferred.

B's are each an oxygen or a sulfur atom, preferably an oxygen atom.

$R^1$ to $R^{16}$ are the same or different from one another and are each at least one atom or group selected from the group consisting of a hydrogen atom, a fluorine atom, alkyl groups, partially or fully halogenated alkyl groups, allyl groups, aryl groups, nitro group and nitrile group.

The alkyl groups include methyl, ethyl, propyl, butyl, amyl, hexyl, cyclohexyl and octyl groups. The halogenated alkyl groups include trifluoromethyl, pentafluoroethyl, perfluoropropyl, perfluorobutyl, perfluoropentyl and perfluorohexyl groups. The allyl groups include propenyl group. The aryl groups include phenyl and pentafluorophenyl groups.

The letters s and t are each an integer ranging from 0 to 4. The letter r is an integer of 0 or 1 or greater generally up to 100, preferably in the range of 1 to 80.

Preferred examples of the structural units with combinations of s, t, A, B, D and $R^1$ to $R^{16}$ include:

(1) structural units in which s is 1; t is 1; A is —C(R')$_2$— (where R' is an alkyl, fluoroalkyl or aryl group), cyclohexylidene group or fluorenylidene group; B is an oxygen atom; D is —CO— or —SO$_2$—; and $R^1$ to $R^{16}$ are each a hydrogen atom or a fluorine atom;

(2) structural units in which s is 1; t is 0; B is an oxygen atom; D is —CO— or —SO$_2$—; and $R^1$ to $R^{16}$ are each a hydrogen atom or a fluorine atom; and (3) structural units in which s is 0; t is 1; A is —C(R')$_2$— (where R' is an alkyl, fluoroalkyl or aryl group), cyclohexylidene group or fluorenylidene group; B is an oxygen atom; and $R^1$ to $R^{16}$ are each a hydrogen atom, a fluorine atom or a nitrile group.

Specifically, the polyarylene having a sulfonic acid group is a polymer represented by Formula (C) below:

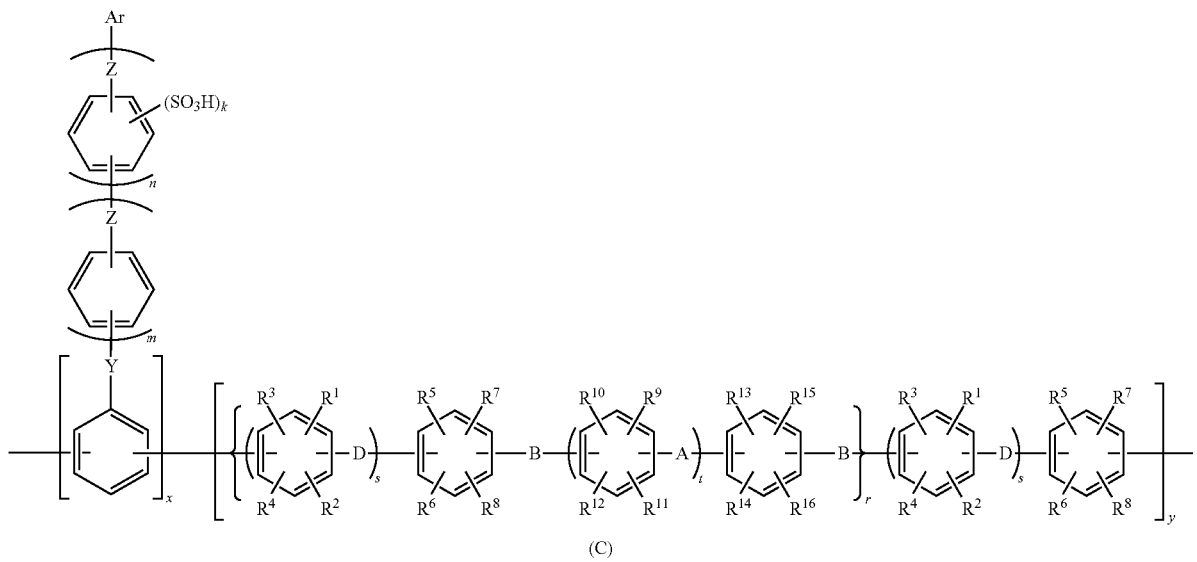

(C)

wherein A, B, D, Y, Z, Ar, k, m, n, r, s, t and $R^1$ to $R^{15}$ are the same as A, B, D, Y, Z, Ar, k, m, n, r, s, t and $R^1$ to $R^{16}$ in Formulae (A) and (B), and x and y each indicate a molar proportion of which the total x+y is 100 mol %.

The polyarylene having a sulfonic acid group contains 0.5 to 100 mol %, preferably 10 to 99.999 mol % the repeating structural units of Formula (A) (namely, the units "x"), and 99.5 to 0 mol %, preferably 90 to 0.001 mol % the repeating structural units of Formula (B) (namely, the units "y").

When the polyarylene includes the structural units (A) and (B) in the above amounts, it has superior water resistance and mechanical strength, and high ion exchange capacity. Consequently, the ion conductive groups in the segment (A) can adsorb and bind thereto increased amounts of water, and the proton conductive membrane shows higher proton conductivity.

The polyarylene may contain structural units other than the aforementioned.

(Production of polyarylene Having Sulfonic Acid Group)

The polyarylene having a sulfonic acid group may be synthesized by copolymerizing a monomer which has a sulfonate group and is capable of forming the structural units of Formula (A) with an oligomer capable of forming the structural units of Formula (B) to produce a polyarylene having a sulfonate group, and hydrolyzing the polyarylene to convert the sulfonate group into the sulfonic acid group.

Alternatively, a polyarylene is previously synthesized which includes structural units with a skeleton represented by Formula (A) except that the structural units have no sulfonic acid or sulfonate groups, and the structural units represented by Formula (B); and the polyarylene is sulfonated to synthesize the polyarylene having a sulfonic acid group.

For convenience of reference, the monomers capable of forming the structural units of Formula (A) will be referred to as monomers (D) represented by, for example, Formula (D) below; and the oligomers capable of forming the structural units of Formula (B) will be referred to as oligomers (E) represented by, for example, Formula (E) below. These monomers and oligomers are copolymerized to synthesize the polyarylene having a sulfonate group. Examples of the monomers (D) include sulfonates represented by Formula (D) below:

[Chem. 7]

$$\underset{X}{\overset{X}{\diagdown}} \diagdown Y \diagdown \left( \diagdown Z \diagdown \right)_m \left( \diagdown Z \diagdown \right)_n Ar$$

(D)

In Formula (D), X denotes a halogen atom other than fluorine (i.e., chlorine, bromine or iodine) or a —$OSO_2Z$ group (where Z is an alkyl, fluorine-substituted alkyl or aryl group); and Y, Z, Ar, m, n and k are as described in Formula (A). $R^a$ denotes a hydrocarbon group of 1 to 20, preferably 4 to 20 carbon atoms. Specific examples thereof include linear hydrocarbon groups, branched hydrocarbon groups, alicyclic hydrocarbon groups and 5-membered heterocyclic hydrocarbon groups, such as methyl, ethyl, n-propyl, iso-propyl, tert-butyl, iso-butyl, n-butyl, sec-butyl, neopentyl, cyclopentyl, hexyl, cyclohexyl, cyclopentylmethyl, cyclohexylmethyl, adamantyl, adamantanemethyl, 2-ethylhexyl, bicyclo[2.2.1]heptyl, bicyclo[2.2.1]heptylmethyl, tetrahydrofurfuryl, 2-methylbutyl, 3,3-dimethyl-2,4-dioxolanemethyl, cyclohexylmethyl, adamantylmethyl and bicyclo[2.2.1]heptylmethyl groups. Of these, n-butyl, neopentyl, tetrahydrofurfuryl, cyclopentyl, cyclohexyl, cyclohexylmethyl, adamantylmethyl and bicyclo[2.2.1]heptylmethyl groups are preferred, and neopentyl group is particularly preferable. Ar denotes an aromatic group with a substituent —$SO_3R^b$. Exemplary aromatic groups include phenyl, naphthyl, anthracenyl and phenanthyl groups, with phenyl and naphthyl groups being preferred.

The aromatic group is substituted with one or two or more substituents —$SO_3R^b$. When two or more substituents $SO_3R^b$ are present, they may be the same as or different from one another.

$R^b$ denotes a hydrocarbon group of 1 to 20, preferably 4 to 20 carbon atoms. Specific examples thereof include the above-described hydrocarbon groups having 1 to 20 carbon atoms. Of such groups, n-butyl, neopentyl, tetrahydrofurfuryl, cyclopentyl, cyclohexyl, cyclohexylmethyl, adamantylmethyl and bicyclo[2.2.1]heptylmethyl groups are preferred, and neopentyl group is particularly preferable.

In the formula, m is an integer of from 0 to 10, preferably from 0 to 2; n is an integer of from 0 to 10, preferably from 0 to 2; and k is an integer of from 1 to 4.

Specific examples of the sulfonates represented by Formula (D) include the following compounds:

[Chem. 8]

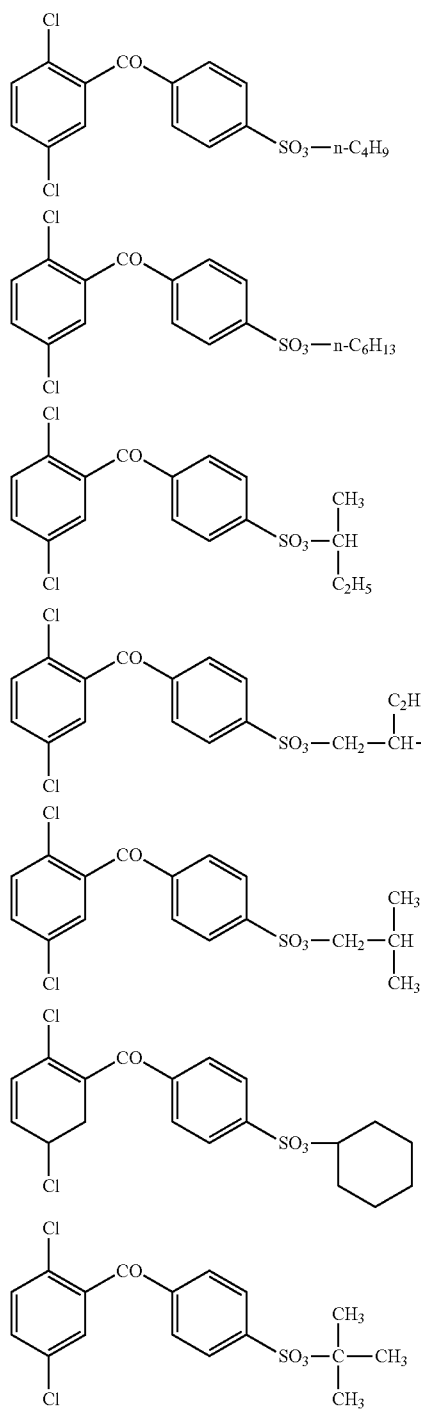

-continued

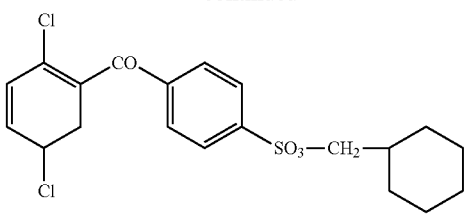

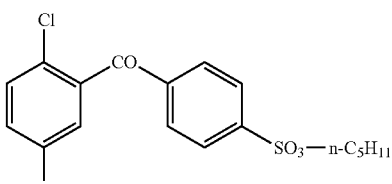

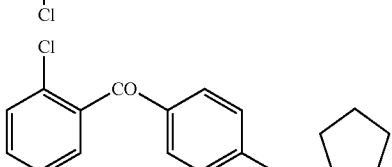

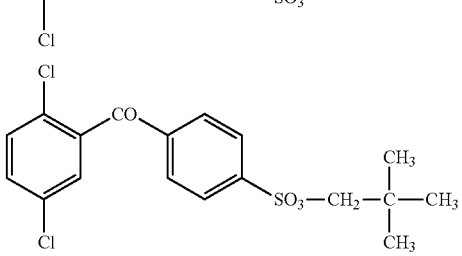

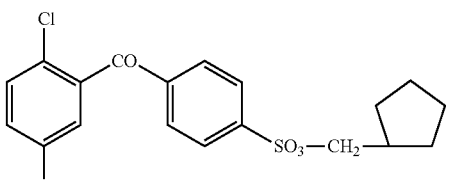

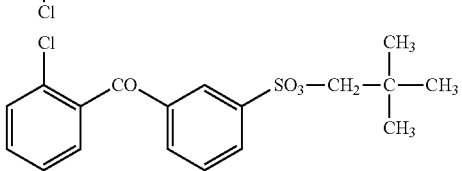

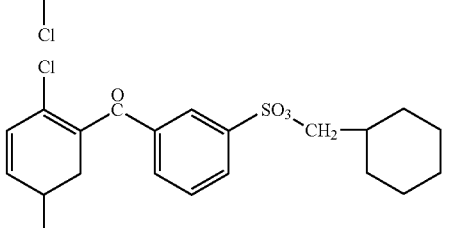

[Chem. 9]

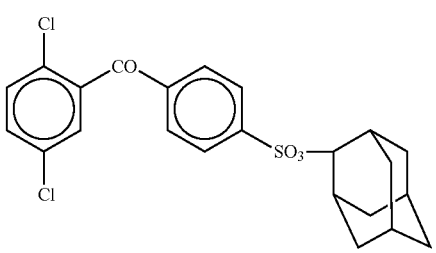

-continued
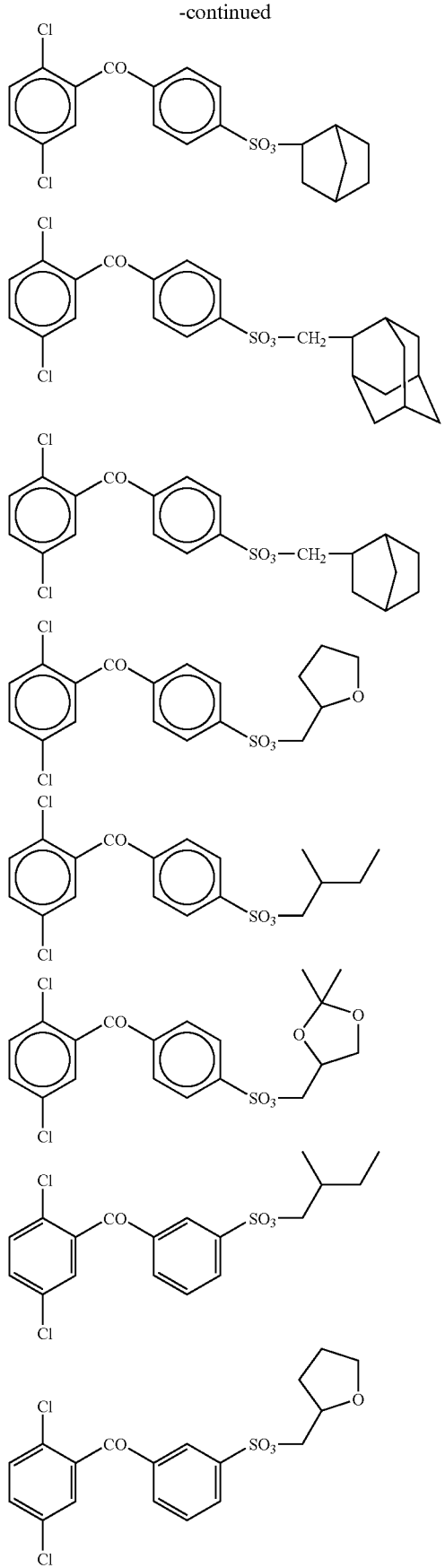
-continued
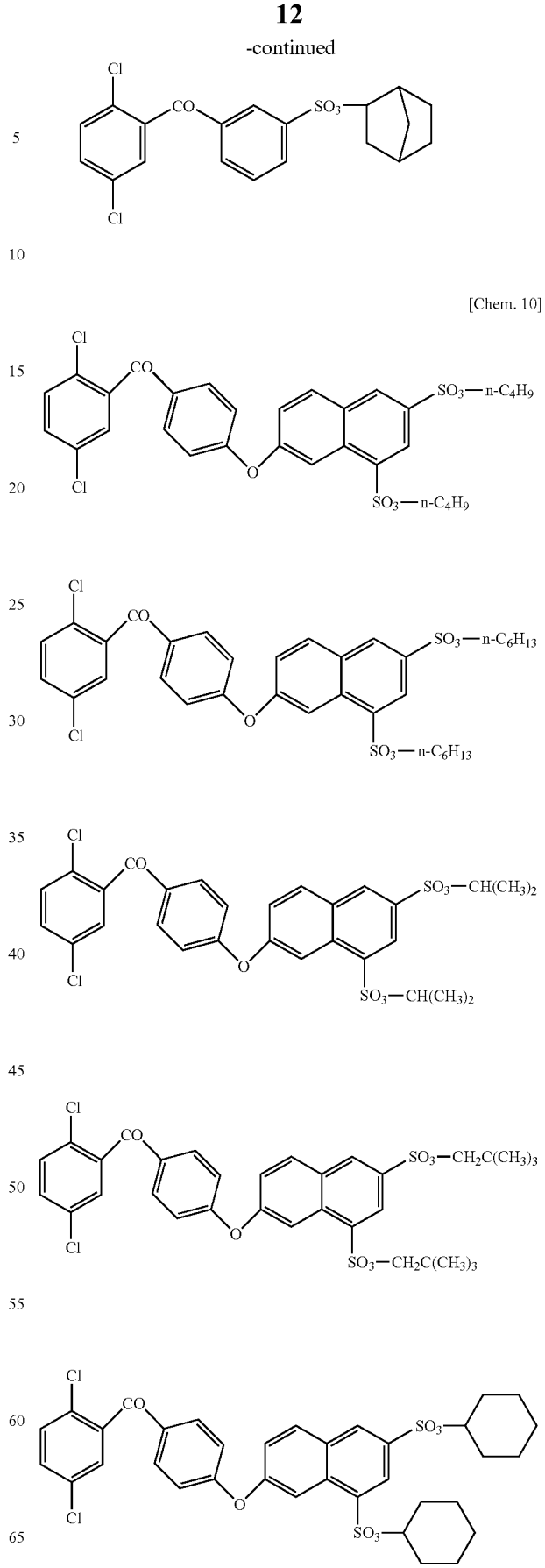
[Chem. 10]

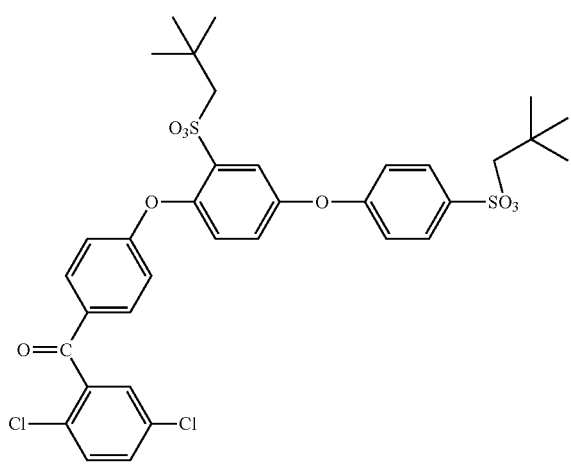
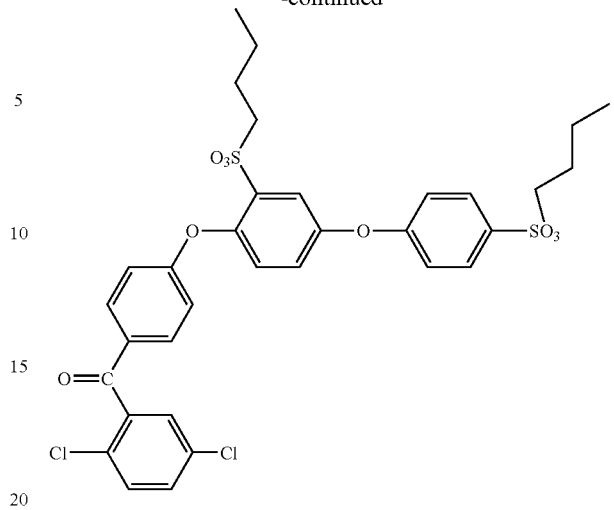
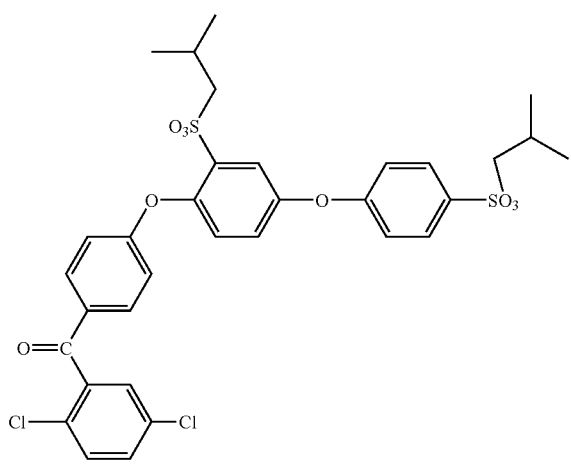
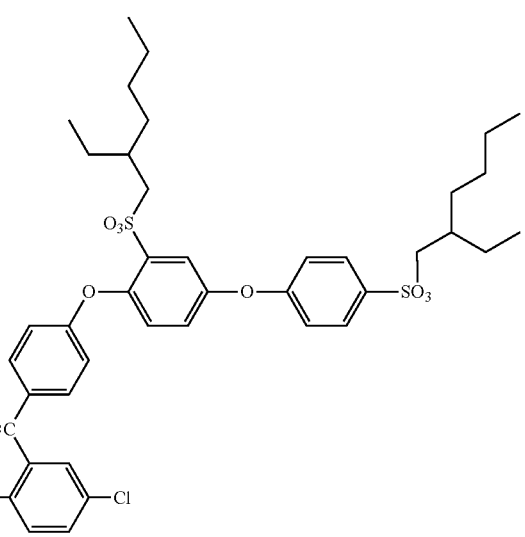
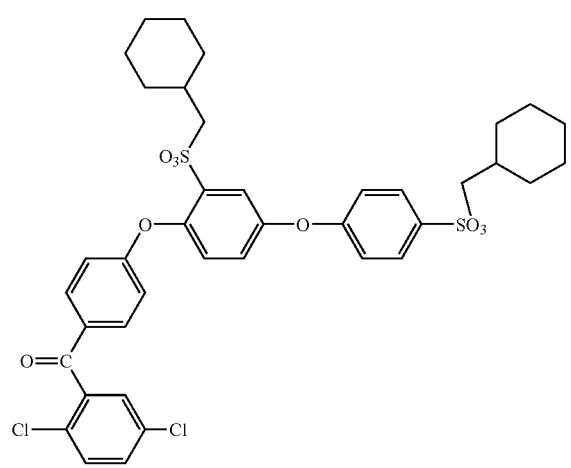
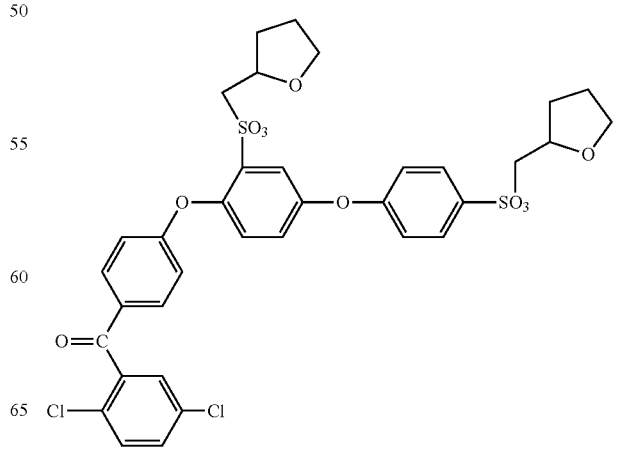

[Chem. 12]
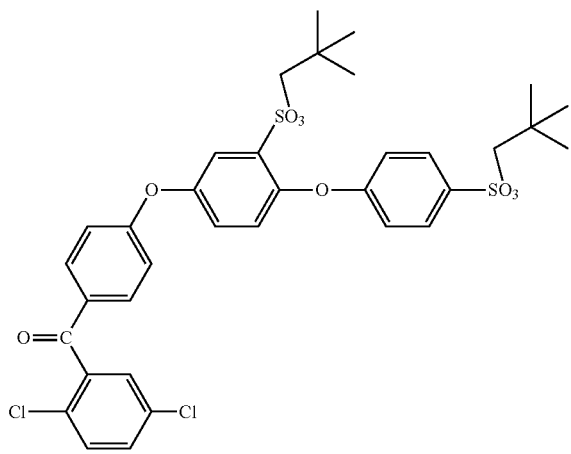
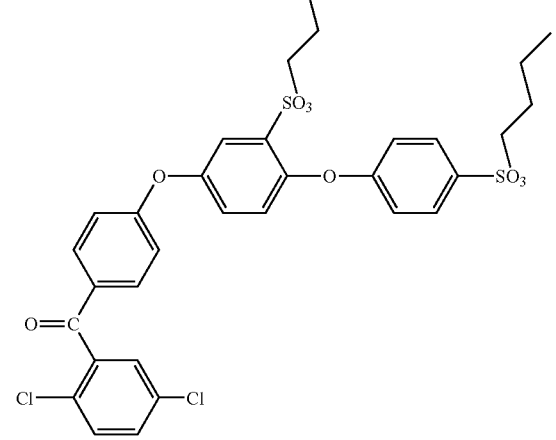
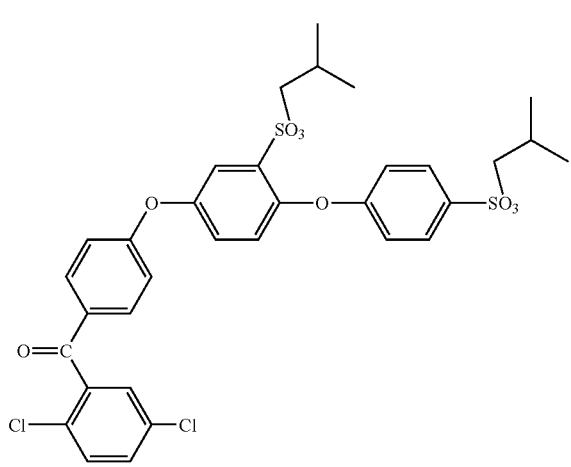
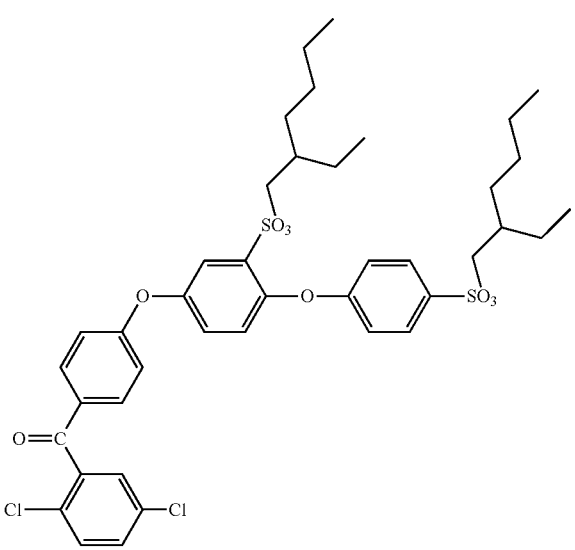
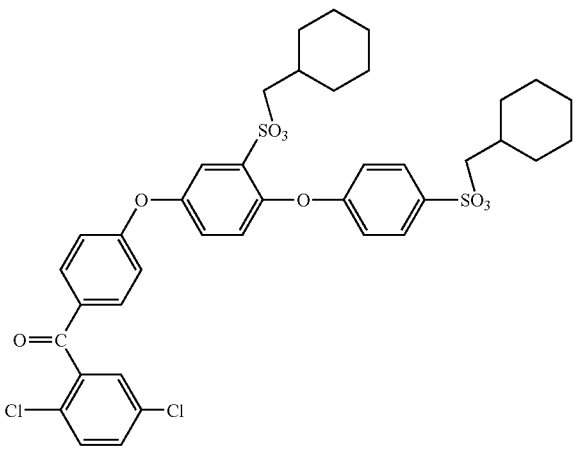
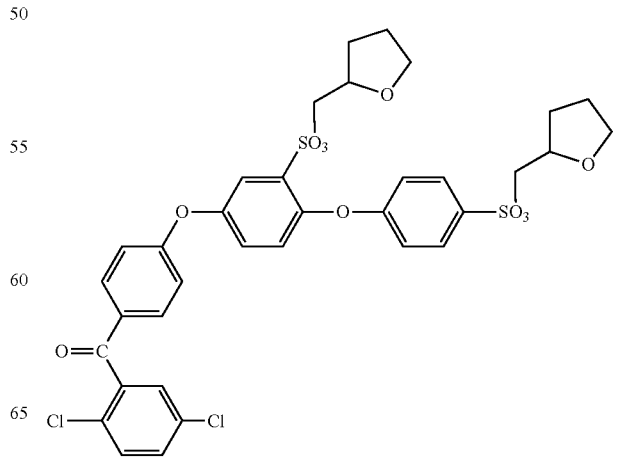

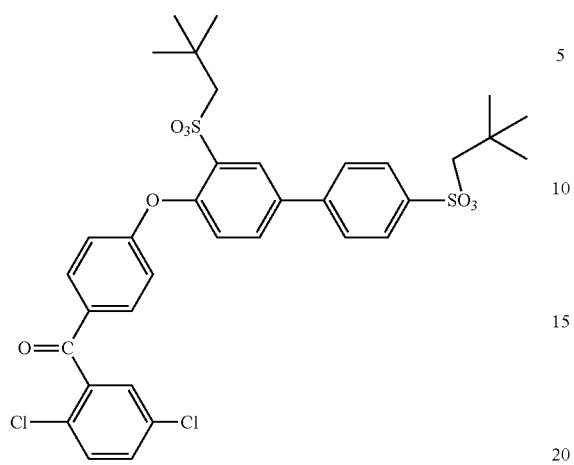
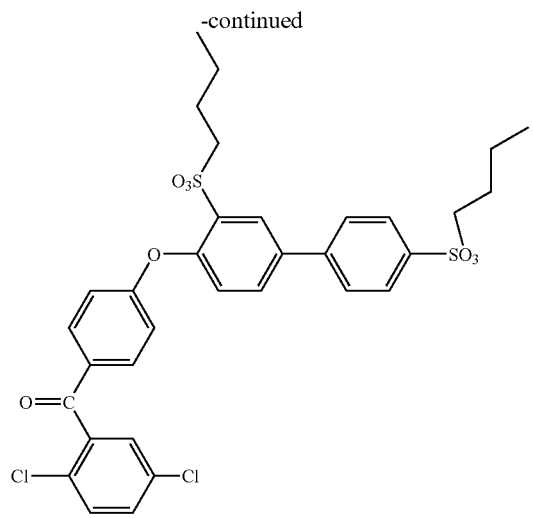
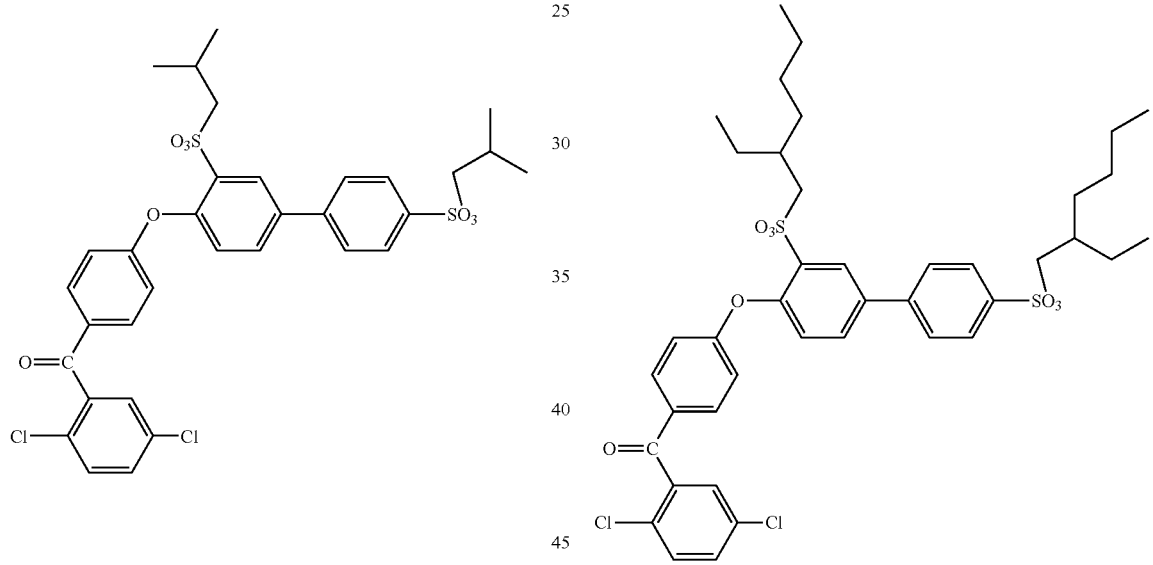
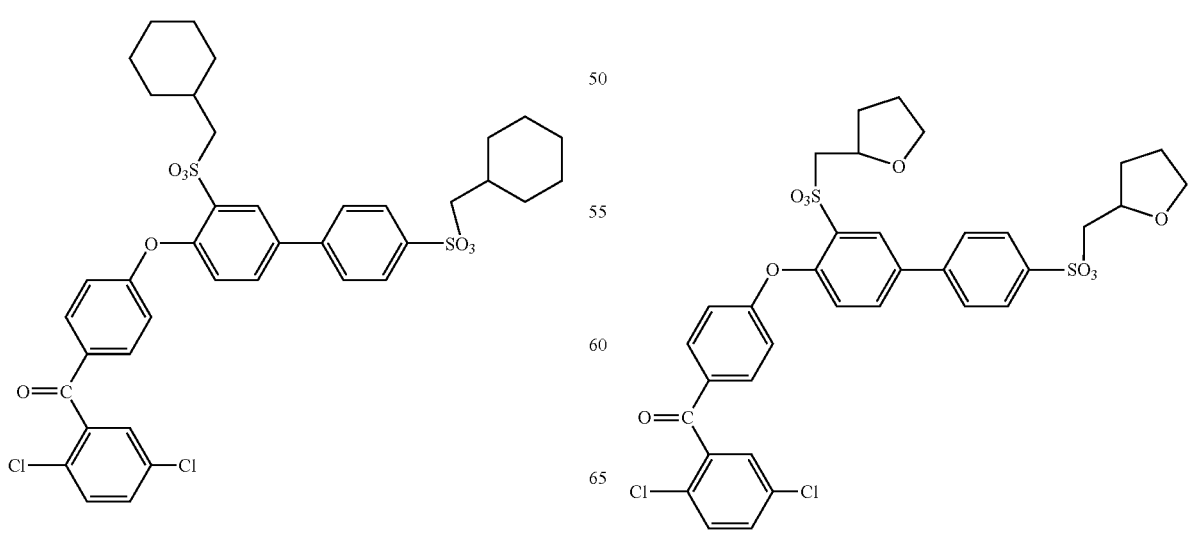

-continued
[Chem. 14]
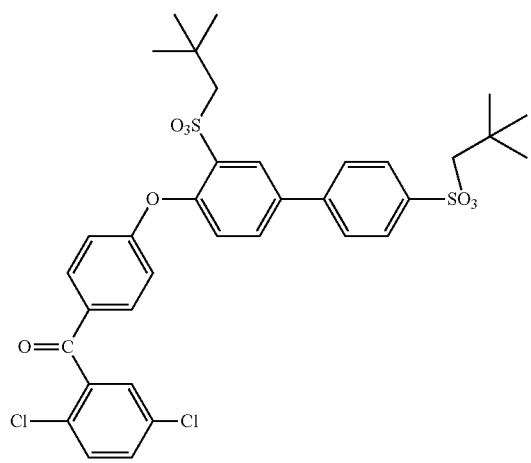
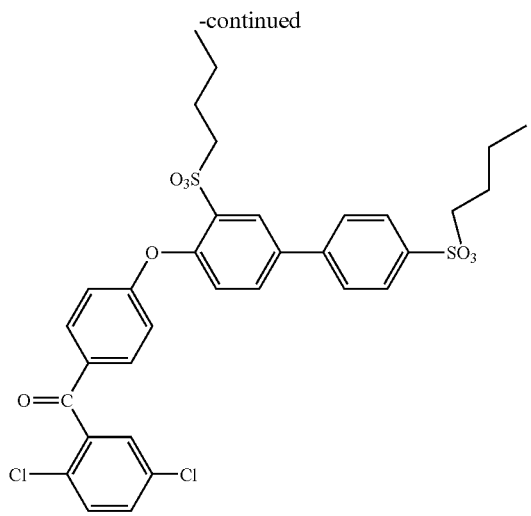
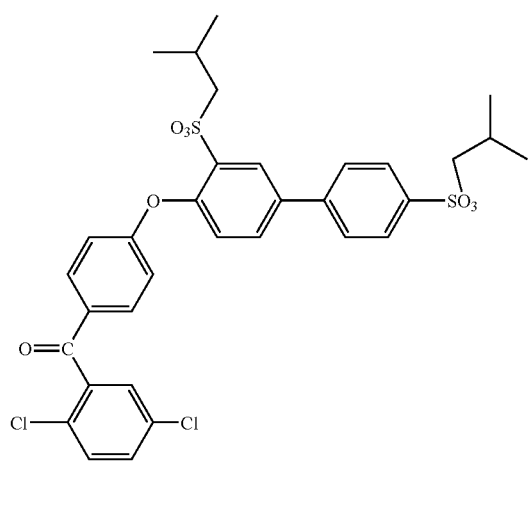
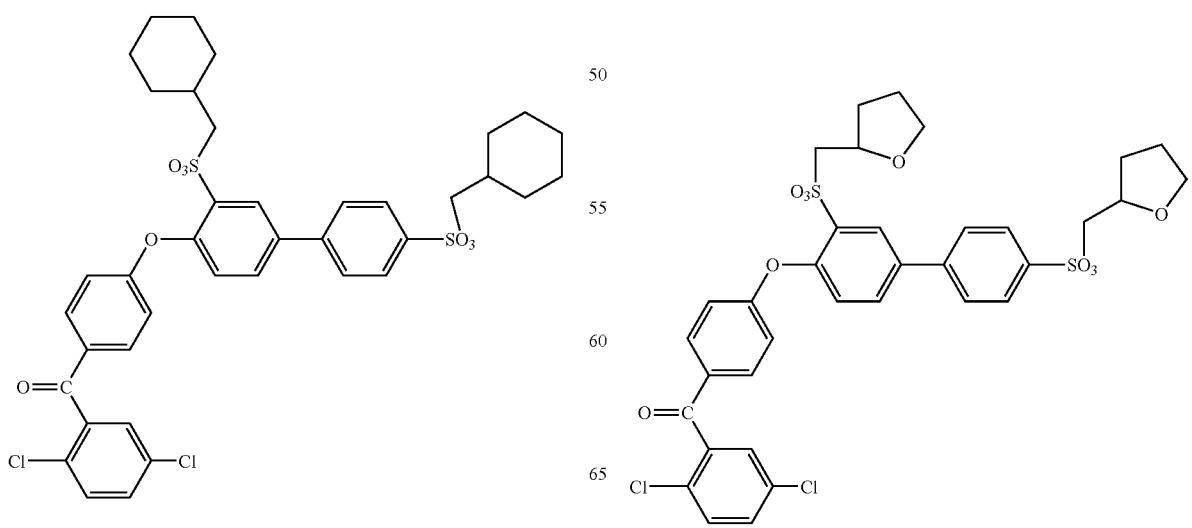

-continued

[Chem. 15]

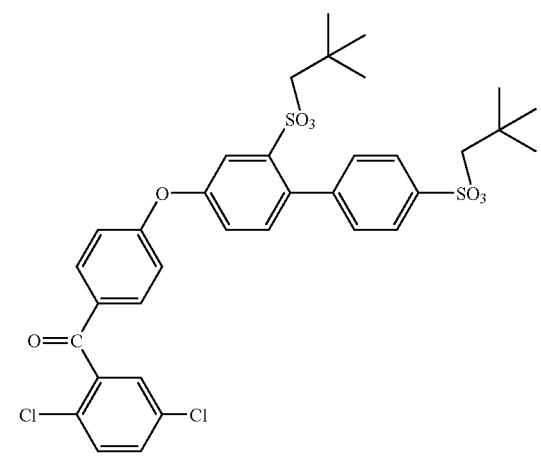

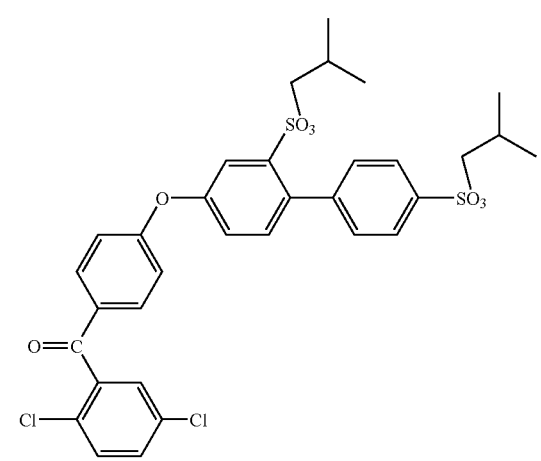

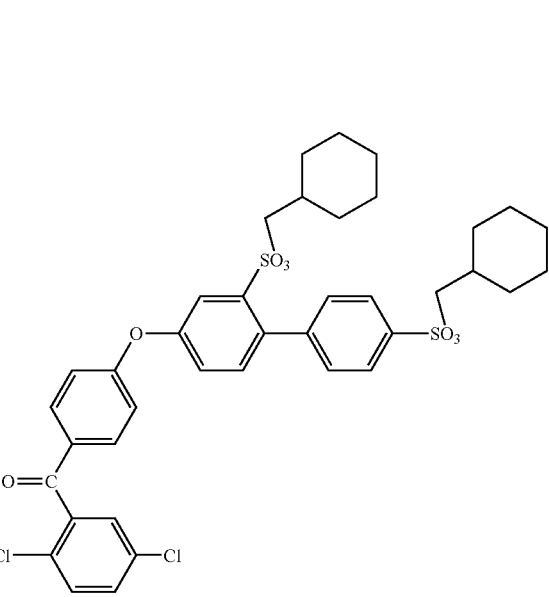

-continued

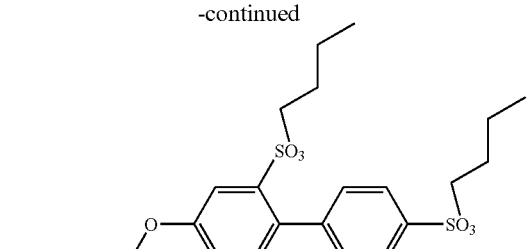

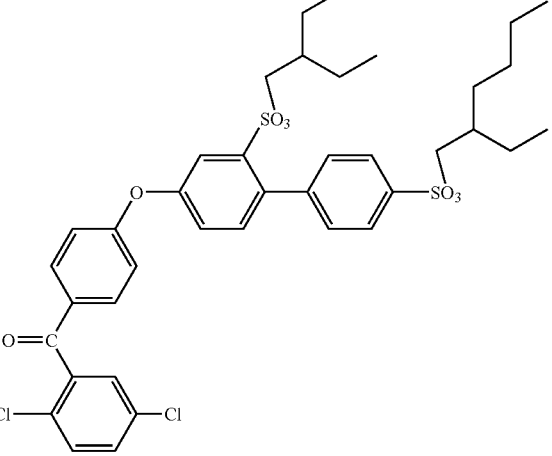

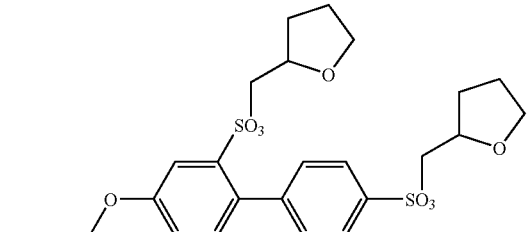

Also employable are aromatic sulfonate derivatives derived from the compounds of Formula (D), in which the chlorine atoms are replaced by bromine atoms, in which —CO— is replaced by —SO$_2$—, and in which the chlorine atoms are replaced by bromine atoms and —CO— is replaced by —SO$_2$—.

The R$^β$ group in Formula (D) is preferably derived from a primary alcohol, and the β carbon atom is preferably tertiary or quaternary. More preferably, such ester group is derived from a primary alcohol and the β carbon atom is quaternary.

When these two conditions are satisfied, excellent stability may be obtained during polymerization and no inhibited polymerization or crosslinking will result from the formation of sulfonic acids by deesterification.

The compounds having a skeleton similar to that of the monomers (D) of Formula (D) except that the compounds have no sulfonic acid or sulfonate groups include the following compounds:

[Chem. 16]

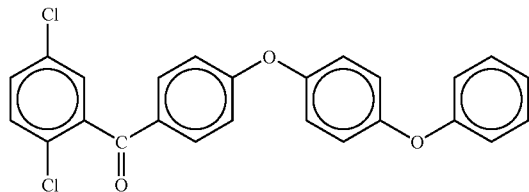

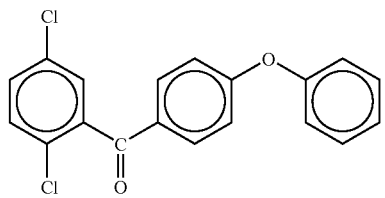

Also Employable are derivatives of the above compounds in which the chlorine atoms are replaced by bromine atoms, in which —CO— is replaced by —$SO_2$—, and in which the chlorine atoms are replaced by bromine atoms and —CO— is replaced by —$SO_2$—.

Examples of the oligomers (E) include compounds represented by Formula (E) below:

[Chem. 17]

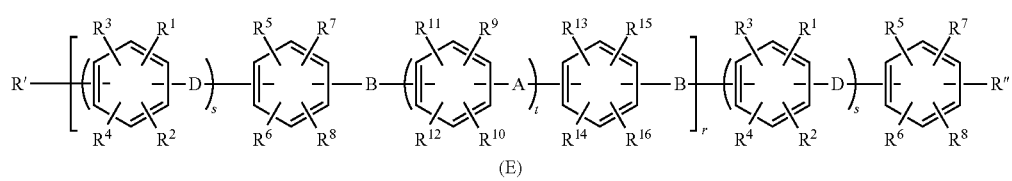

(E)

-continued

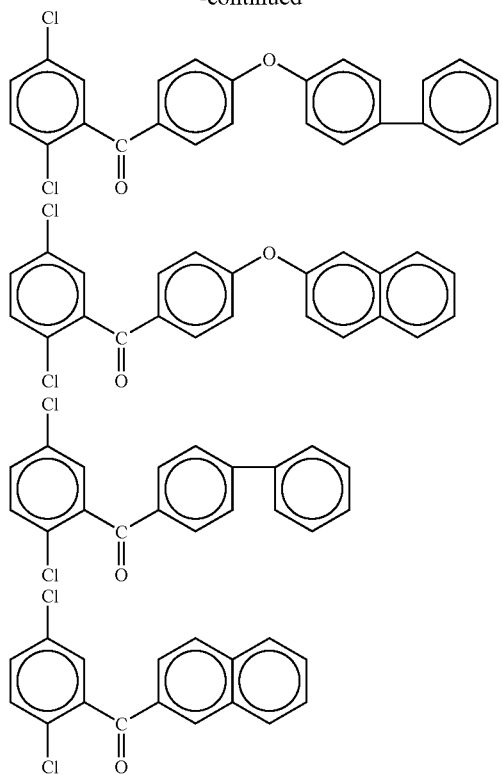

In Formula (E), R' and R" are the same or different and are each a halogen atom other than fluorine or a —$OSO_2Z$ group (where Z is an alkyl, fluorine-substituted alkyl or aryl group) Indicated by Z, the alkyl groups include methyl and ethyl groups, the fluorine-substituted alkyl groups include trifluoromethyl group, and the aryl groups include phenyl and p-tolyl groups.

In Formula (E), A and D are each a direct bond or at least one structure selected from the group consisting of —CO—, —$SO_2$—, —SO—, —CONH—, —COO—, —$(CF_2)_l$— (where 1 is an integer ranging from 1 to 10), —$(CH_2)_l$— (where 1 is an integer ranging from 1 to 10), —$C(R')_2$— (where R' is an alkyl group, a fluoroalkyl group or an aryl group), —O—, —S—, cyclohexylidene group and fluorenylidene group.

Examples of R' in the structure —$C(R')_2$— include alkyl groups such as methyl, ethyl and propyl groups, fluoroalkyl groups such as trifluoromethyl and heptafluoroethyl groups, and aryl groups such as phenyl and naphthyl groups. Specific examples of the structures —$C(R')_2$— include —$C(CF_3)_2$—, —$C(CH_3)_2$— and —$C(C_6H_5)_2$—.

In particular, direct bond, —Co—, —$SO_2$—, —$C(R')_2$— (where R' is an alkyl, fluoroalkyl or aryl group), —O—, cyclohexylidene group and fluorenylidene group are preferred.

B's are each an oxygen or a sulfur atom, preferably an oxygen atom.

$R^1$ to $R^{16}$ are the same or different from one another and are each at least one atom or group selected from the group consisting of a hydrogen atom, a fluorine atom, alkyl groups, partially or fully halogenated alkyl groups, allyl groups, aryl groups, nitro group and nitrile group.

The alkyl groups include methyl, ethyl, propyl, butyl, amyl, hexyl, cyclohexyl and octyl groups. The halogenated alkyl groups include trifluoromethyl, pentafluoroethyl, perfluoropropyl, perfluorobutyl, perfluoropentyl and perfluorohexyl groups. The allyl groups include propenyl group. The aryl groups include phenyl and pentafluorophenyl groups.

The letters s and t are each an integer ranging from 0 to 4. The letter r is an integer of 0 or 1 or greater generally up to 100, preferably in the range of 1 to 80.

Preferred examples of the compounds with combinations of s, t, A, B, D and $R^1$ to $R^{16}$ include:

(1) compounds in which s is 1; t is 1; A is —C(R')$_2$— (where R' is an alkyl, fluoroalkyl or aryl group), cyclohexylidene group or fluorenylidene group; B is an oxygen atom; D is —CO— or —SO$_2$—; and $R^1$ to $R^{16}$ are each a hydrogen atom or a fluorine atom;

(2) compounds in which s is 1; t is 0; B is an oxygen atom; D is —CO— or —SO$_2$—; and $R^1$ to $R^{16}$ are each a hydrogen atom or a fluorine atom; and (3) compounds in which s is 0; t is 1; A is —C(R')$_2$— (where $R^1$ is an alkyl, fluoroalkyl or aryl group), cyclohexylidene group or fluorenylidene group; B is an oxygen atom; and $R^1$ to $R^{16}$ are each a hydrogen atom, a fluorine atom or a nitrile group.

Specific examples of the compounds having Formula (E) in which r is 0 include 4,4'-dichlorobenzophenone, 4,4'-dichlorobenzanilide, bis(chlorophenyl)difluoromethane, 2,2-bis(4-chlorophenyl)hexafluoropropane, 4-chlorobenzoic acid-4-chlorophenyl, bis(4-chlorophenyl)sulfoxide, bis(4-chlorophenyl)sulfone, 2,6-dichlorobenzonitrile, 9,9-bis(4-hydroxyphenyl)fluorene, derivatives of these compounds in which the chlorine atom is replaced by a bromine or an iodine atom, and derivatives of these compounds in which at least one of the halogen atoms substituted at the 4-position is substituted at the 3-position.

Specific examples of the compounds having Formula (E) in which r is 1 include 4,4'-bis(4-chlorobenzoyl)diphenyl ether, 4,4'-bis(4-chlorobenzoylamino)diphenyl ether, 4,4'-bis(4-chlorophenylsulfonyl)diphenyl ether, 4,4'-bis(4-chlorophenyl)diphenyl ether dicarboxylate, 4,4'-bis[(4-chlorophenyl)-1,1,1,3,3,3-hexafluoropropyl]diphenyl ether, 4,4'-bis[(4-chlorophenyl)tetrafluoroethyl]diphenyl ether, derivatives of these compounds in which the chlorine atom is replaced by a bromine or an iodine atom, derivatives of these compounds in which the halogen substitution occurs at the 3-position in place of the 4-position, and derivatives of these compounds in which at least one of the substituents at the 4-position in the diphenyl ether is substituted at the 3-position.

The compounds having Formula (E) further include 2,2-bis[4-{4-(4-chlorobenzoyl)phenoxy}phenyl]-1,1,1,3,3,3-hexafluoropropane, bis[4-{4-(4-chlorobenzoyl)phenoxy}phenyl]sulfone, and compounds represented by the following formulae:

[Chem. 18]

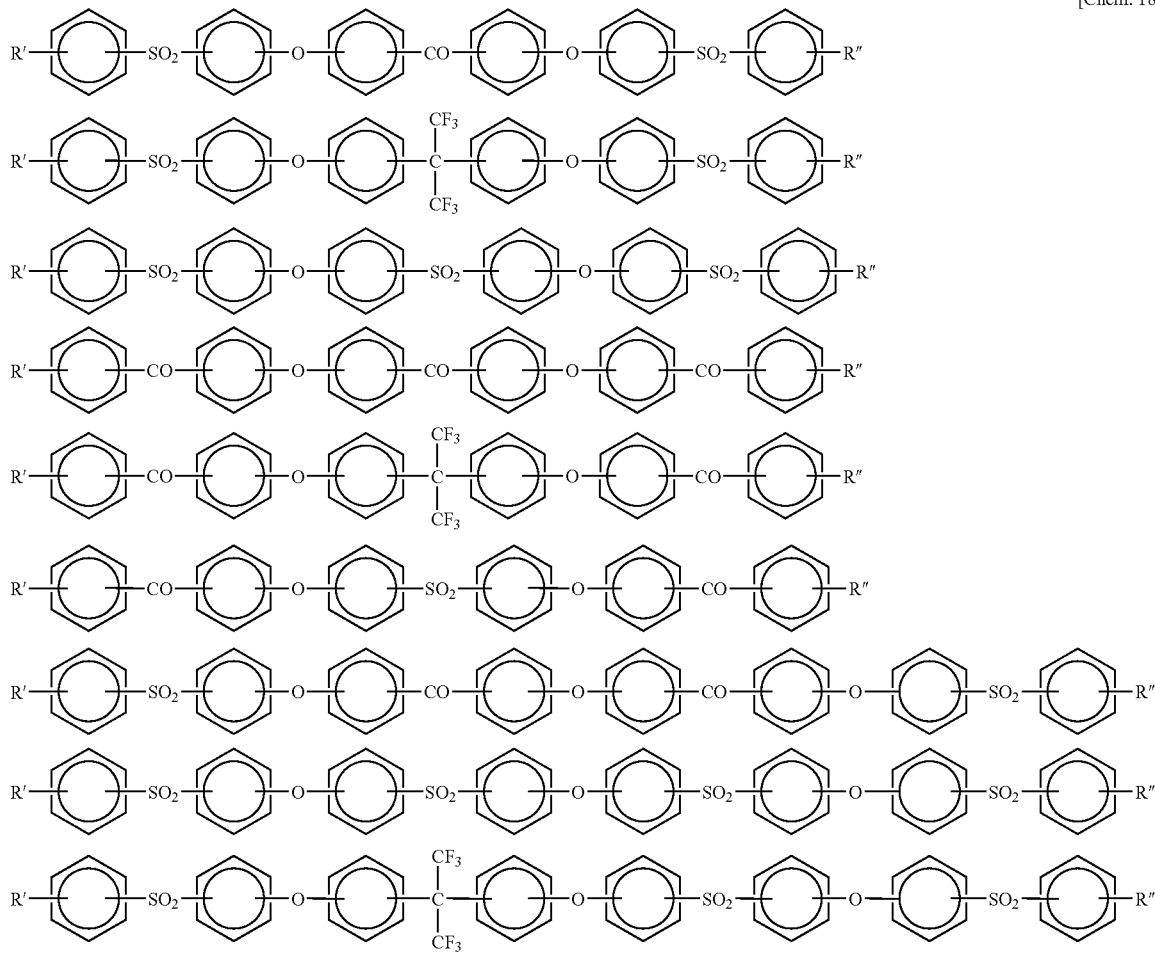

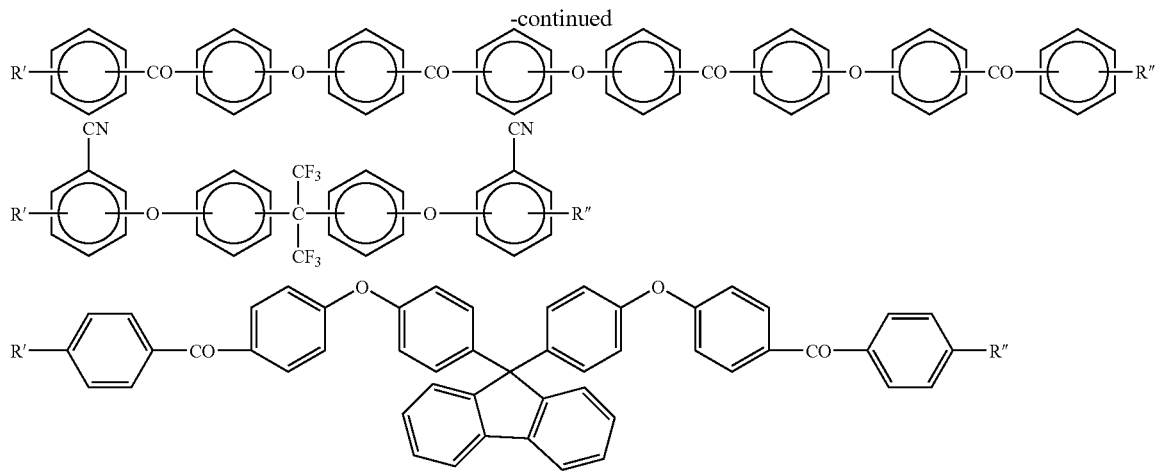

For example, the compounds represented by Formula (E) may be synthesized by the following process.

First, the bisphenols combined together by the electron-withdrawing groups are converted into an alkali metal salt of corresponding bisphenol by addition of an alkali metal such as lithium, sodium or potassium, or an alkali metal compound such as an alkali metal hydride, an alkali metal hydroxide or an alkali metal carbonate, in a polar solvent of high dielectric constant such as N-methyl-2-pyrrolidone, N,N-dimethylacetamide, sulfolane, diphenyl sulfone or dimethyl sulfoxide.

The alkali metal is generally used in slight excess over the hydroxyl groups of the bisphenol, for example 1.1 to 2 times, preferably 1.2 to 1.5 times the equivalent weight of the hydroxyl groups. Thereafter, the alkali metal salt of bisphenol is reacted with a halogen-substituted, e.g., fluorine- or chlorine-substituted, aromatic dihalide compound which has been activated by the electron-withdrawing groups, in the presence of a solvent that can form an azeotropic mixture with water, such as benzene, toluene, xylene, hexane, cyclohexane, octane, chlorobenzene, dioxane, tetrahydrofuran, anisole or phenetole. Examples of the aromatic dihalide compounds include 4,4'-difluorobenzophenone, 4,4'-dichlorobenzophenone, 4,4'-chlorofluorobenzophenone, bis(4-chlorophenyl)sulfone, bis(4-fluorophenyl)sulfone, 4-fluorophenyl-4'-chlorophenylsulfone, bis(3-nitro-4-chlorophenyl)sulfone, 2,6-dichlorobenzonitrile, 2,6-difluorobenzonitrile, hexafluorobenzene, decafluorobiphenyl, 2,5-difluorobenzophenone and 1,3-bis(4-chlorobenzoyl)benzene. From the viewpoint of reactivity, the aromatic dihalide compound is preferably a fluorine compound. But taking the subsequent aromatic coupling reaction into account, the aromatic nucleophilic substitution reaction should be designed to take place so as to yield a molecule having a chlorine atom at its end(s). The active aromatic dihalide compound may be used in an amount 2 to 4 times, preferably 2.2 to 2.8 times the moles of the bisphenol. The bisphenol may be formed into an alkali metal salt of bisphenol prior to the aromatic nucleophilic substitution reaction. The reaction temperature is in the range of 60 to 300° C., preferably 80 to 250° C. The reaction time ranges from 15 minutes to 100 hours, preferably from 1 to 24 hours. Optimally, the active aromatic dihalide compound is a chlorofluoro compound as shown in the formula below that has two halogen atoms different in reactivity from each other. The use of this compound is advantageous in that the fluorine atom preferentially undergoes the nucleophilic substitution reaction with phenoxide so that the objective chlorine-terminated active compound may be obtained.

[Chem. 19]

wherein A is as defined in Formula (E).

Alternatively, the nucleophilic substitution reaction may be carried out in combination with electrophilic substitution reaction to synthesize an objective flexible compound including the electron-withdrawing and electron-donating groups, as described in JP-A-H02-159.

Specifically, the aromatic bis-halide activated by the electron-withdrawing groups, such as bis(4-chlorophenyl)sulfone, is subjected to the nucleophilic substitution reaction with a phenol; thereafter the resultant bis-phenoxy compound is subjected to Friedel-Crafts reaction with, for example, 4-chlorobenzoyl chloride to give an objective compound. Examples of the aromatic bis-halides activated by the electron-withdrawing groups include the compounds described above. The phenol compound may be substituted, but is preferably unsubstituted from the viewpoints of heat resistance and flexibility. When substituted, the substituted phenol compound is preferably an alkali metal salt. Any of the alkali metal compounds mentioned above can be used for this purpose. The alkali metal compound may be used in an amount 1.2 to 2 times the mole of the phenol. In the reaction, the aforesaid polar solvent or the azeotropic solvent with water may be employed. The bis-phenoxy compound is reacted with the acylating agent chlorobenzoyl chloride in the presence of a Friedel-Crafts reaction activator such as Lewis acid catalyst like aluminum chloride, boron trifluoride or zinc chloride. The chlorobenzoyl chloride is used in an amount 2 to 4 times, preferably 2.2 to 3 times the moles of the bis-phenoxy compound. The Friedel-Crafts reaction activator is used in an amount 1.1 to 2 times the moles of the active halide compound such as the acylating agent chlorobenzoic acid. The reaction time is in the range of 15 minutes to 10 hours, and the reaction temperature is in the range of −20 to 80° C. The solvent used herein may be chlorobenzene, nitrobenzene or the like that is inactive in the Friedel-crafts reaction.

The compounds of Formula (E) in which r is 2 or greater may be synthesized by polymerization in accordance with the above-mentioned procedure. In this case, a bisphenol such as 2,2-bis(4-hydroxyphenyl)-1,1,1,3,3,3-hexafluoropropane, 2,2-bis(4-hydroxyphenyl)ketone or 2,2-bis(4-hydroxyphenyl) sulfone is converted into an alkali metal salt of bisphenol and is subjected to substitution reaction with an excess of the activated aromatic halide such as 4,4-dichlorobenzophenone or bis(4-chlorophenyl)sulfone, in the presence of a polar solvent such as N-methyl-2-pyrrolidone, N,N-dimethylacetamide or sulfolane.

Examples of such compounds include those represented by the following formulae:

[Chem. 20]

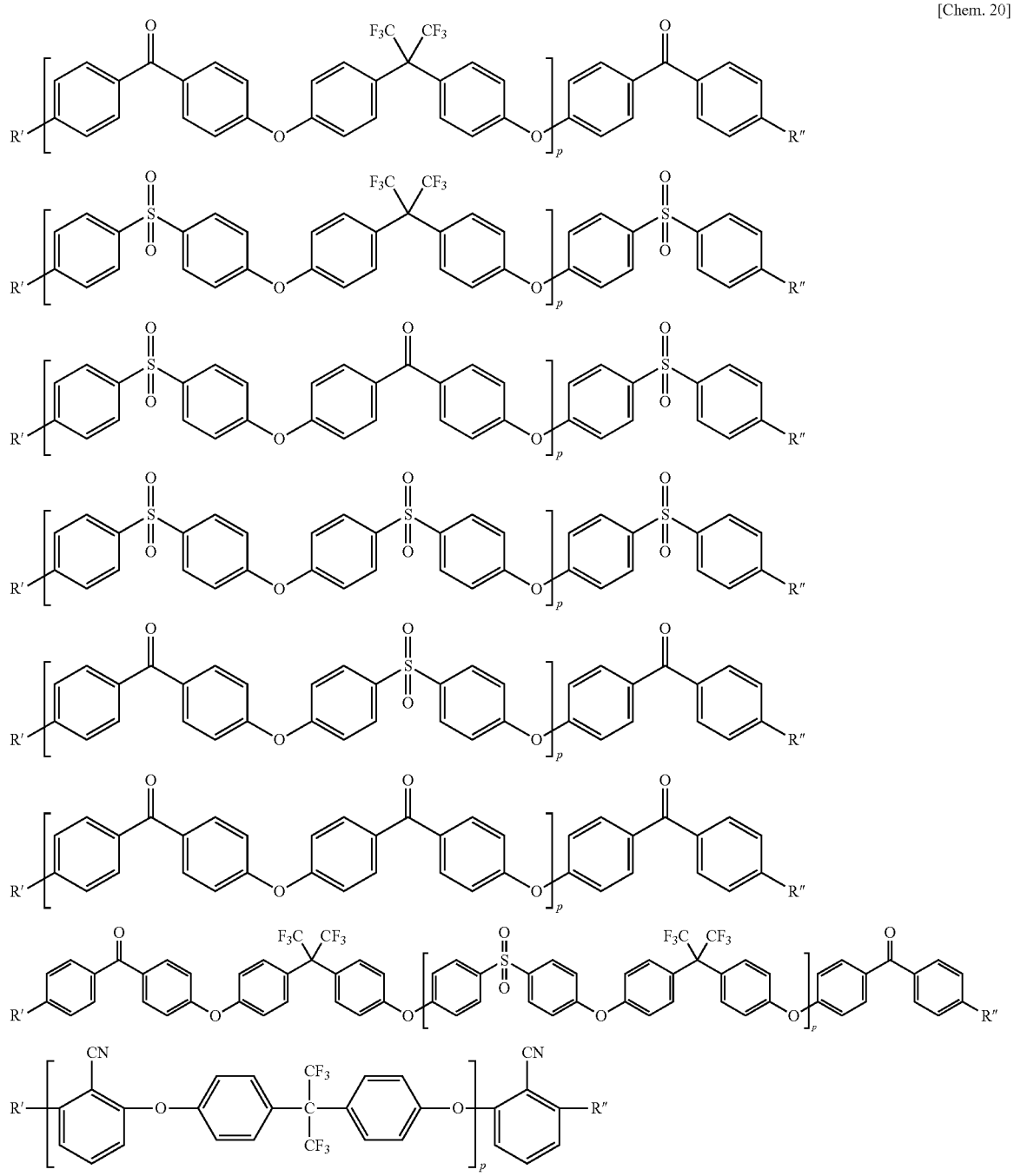

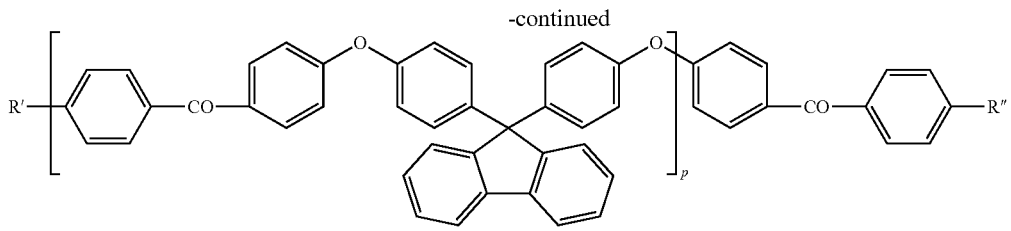

In the above formulae, p is 0 or a positive integer, generally up to 100, and is preferably from 10 to 80.

To synthesize the polyarylene (C) having a sulfonate group, the monomer (D) and the oligomer (E) are reacted in the presence of a catalyst.

The catalyst used herein is a catalyst system containing a transition metal compound. This catalyst system essentially contains (1) a transition metal salt and a compound which functions as a ligand (referred to as the "ligand component" hereinafter), or a transition metal complex (including a copper salt) to which ligands are coordinated, and (2) a reducing agent. A "salt" may be added to increase the polymerization rate.

Examples of the transition metal salts include nickel compounds such as nickel chloride, nickel bromide, nickel iodide and nickel acetylacetonate; palladium compounds such as palladium chloride, palladium bromide and palladium iodide; iron compounds such as iron chloride, iron bromide and iron iodide; and cobalt compounds such as cobalt chloride, cobalt bromide and cobalt iodide. Of these, nickel chloride and nickel bromide are particularly preferred.

Examples of the ligand components include triphenylphosphine, 2,2'-bipyridine, 1,5-cyclooctadiene and 1,3-bis(diphenylphosphino)propane. Of these, triphenylphosphine and 2,2'-bipyridine are preferred. The ligand components may be used singly or in combination of two or more kinds.

Examples of the transition metal complexes with coordinated ligands include nickel chloride-bis(triphenylphosphine), nickel bromide-bis(triphenylphosphine), nickel iodide-bis(triphenylphosphine), nickel nitrate-bis(triphenylphosphine), nickel chloride(2,2'-bipyridine), nickel bromide(2,2'-bipyridine), nickel iodide(2,2'-bipyridine), nickel nitrate(2,2'-bipyridine), bis(1,5-cyclooctadiene)nickel, tetrakis(triphenylphosphine)nickel, tetrakis(triphenylphosphito)nickel and tetrakis(triphenylphosphine)palladium. Of these, nickel chloride-bis(triphenylphosphine) and nickel chloride(2,2'-bipyridine) are preferred.

Examples of the reducing agents employable in the catalyst system include iron, zinc, manganese, aluminum, magnesium, sodium and calcium. Of these, zinc, magnesium and manganese are preferable. These reducing agents may be used in a more activated form by being contacted with an acid such as an organic acid.

Examples of the "salts" employable in the catalyst system include sodium compounds such as sodium fluoride, sodium chloride, sodium bromide, sodium iodide and sodium sulfate; potassium compounds such as potassium fluoride, potassium chloride, potassium bromide, potassium iodide and potassium sulfate; and ammonium compounds such as tetraethylammonium fluoride, tetraethylammonium chloride, tetraethylammonium bromide, tetraethylammonium iodide and tetraethylammonium sulfate. Of these, sodium bromide, sodium iodide, potassium bromide, tetraethylammonium bromide and tetraethylammonium iodide are preferred.

The transition metal salt or the transition metal complex is usually used in an amount of 0.0001 to 10 mol, preferably 0.01 to 0.5 mol per mol of the monomer and the oligomer combined (or simply the total of the monomers, (D)+(E), the same applies hereinafter). If the amount is less than 0.0001 mol, the polymerization may not proceed sufficiently. The amount exceeding 10 mol may result in a lowered molecular weight.

When the catalyst system contains the transition metal salt and the ligand component, the ligand component usually has an amount of 0.1 to 100 mol, preferably 1 to 10 mol per mol of the transition metal salt. If the amount is less than 0.1 mol, the catalytic activity may become insufficient. The amount exceeding 100 mol may result in a lowered molecular weight.

The amount of the reducing agent is usually in the range of 0.1 to 100 mol, preferably 1 to 10 mol per mol of the total of the monomers. If the reducing agent is used in an amount less than 0.1 mol, the polymerization may not proceed sufficiently. The amount thereof exceeding 100 mol may make purification of the resulting polymer difficult.

When the "salt" is used, the amount thereof is usually 0.001 to 100 mol, preferably 0.01 to 1 mol per mol of the total of the monomers. If the salt is used in an amount less than 0.001 mol, the effect of increasing the polymerization rate is often insufficient. The amount thereof exceeding 100 mol may result in difficult purification of the resulting polymer.

Suitable polymerization solvents for use in the reaction between the monomer (D) and the oligomer (E) include tetrahydrofuran, cyclohexanone, dimethyl sulfoxide, N,N-dimethylformamide, N,N-dimethylacetamide, N-methyl-2-pyrrolidone, γ-butyrolactone and N,N'-dimethylimidazolidinone. Of these, tetrahydrofuran, N,N-dimethylformamide, N,N-dimethylacetamide, N-methyl-2-pyrrolidone and N,N'-dimethylimidazolidinone are preferred. These polymerization solvents are desirably used after dried sufficiently.

The concentration of all the monomers combined in the polymerization solvent is usually in the range of 1 to 90% by weight, preferably 5 to 40% by weight.

The polymerization temperature generally ranges from 0 to 200° C., preferably from 50 to 120° C. The polymerization time is usually in the range of 0.5 to 100 hours, preferably 1 to 40 hours.

The polyarylene with a sulfonate group obtained using the monomer (D) is subjected to hydrolysis to convert the sulfonate group into the sulfonic acid group, thereby obtaining the polyarylene having a sulfonic acid group.

For example, the hydrolysis may be performed by any of the following methods:

(1) The polyarylene with a sulfonate group is added to an excess of water or an alcohol that contains a little hydrochloric acid, and the mixture is stirred for at least 5 minutes.

(2) The polyarylene with a sulfonate group is reacted in trifluoroacetic acid at about 80 to 120° C. for about 5 to 10 hours.

(3) The polyarylene with a sulfonate group is reacted in a solution such as N-methylpyrrolidone that contains lithium bromide in an amount 1 to 3 times the moles of the sulfonate groups (—SO₃R) of the polyarylene, at about 80 to 150° C. for about 3 to 10 hours, followed by addition of hydrochloric acid.

Alternatively, the polyarylene having a sulfonic acid group may be obtained by copolymerizing a monomer having a skeleton similar to that of the monomer (D) of Formula (D) except having no sulfonate groups with the oligomer (E) of Formula (E), and sulfonating the thus-synthesized polyarylene copolymer. Specifically, a polyarylene having no sulfonic acid group is produced as described above and is treated with a sulfonating agent to introduce the sulfonic acid group in the polyarylene. The polyarylene having a sulfonic acid group may be thus obtained.

The sulfonation may be performed by treating the polyarylene having no sulfonic acid group with a sulfonating agent in the absence or presence of a solvent by a common method, whereby the sulfonic acid group is introduced in the polymer.

For introduction of the sulfonic acid groups, the polyarylene having no sulfonic acid group may be sulfonated with a known sulfonating agent such as sulfuric anhydride, fuming sulfuric acid, chlorosulfonic acid, sulfuric acid or sodium bisulfite, under known conditions.

Polymer Preprints, Japan, vol. 42, No. 3, p. 730 (1993)
Polymer Preprints, Japan, vol. 43, No. 3, p. 736 (1994)
Polymer Preprints, Japan, vol. 42, No. 7, pp. 2490-2492 (1993)

Specifically, the polyarylene having no sulfonic acid group is reacted with the sulfonating agent in the absence or presence of a solvent. The solvents used herein include hydrocarbon solvents such as n-hexane; ether solvents such as tetrahydrofuran and dioxane; aprotic polar solvents such as dimethylacetamide, dimethylformamide and dimethyl sulfoxide; and halogenated hydrocarbons such as tetrachloroethane, dichloroethane, chloroform and methylene chloride. The reaction temperature is not particularly limited, but is usually in the range of −50 to 200° C., preferably −10 to 100° C. The reaction time is usually from 0.5 to 1,000 hours, preferably from 1 to 200 hours.

The thus-produced polyarylene (C) having a sulfonic acid group will generally contain the sulfonic acid groups in an amount of 0.3 to 5 meq/g, preferably 0.5 to 3 meq/g, more preferably 0.8 to 2.8 meq/g. If the content of sulfonic acid groups is less than 0.3 meq/g, the proton conductivity will not reach a practical level. When it exceeds 5 meq/g, water resistance will be drastically deteriorated.

The content of sulfonic acid groups may be controlled by changing the types, amounts and combinations of the monomer (D) and the oligomer (E).

The polyarylene having a sulfonic acid group has a weight-average molecular weight in terms of polystyrene of 10,000 to 1,000,000, preferably 20,000 to 800,000, as measured by gel permeation chromatography (GPC).

The polyarylene having a sulfonic acid group may contain an anti-aging agent, preferably a hindered phenol compound with a molecular weight of not less than 500. Such anti-aging agents provide higher durability of the electrolyte.

The hindered phenol compounds employable in the invention include triethylene
glycol-bis[3-(3-t-butyl-5-methyl-4-hydroxyphenyl)propionate] (trade name: IRGANOX 245),
1,6-hexanediol-bis[3-(3,5-di-t-butyl-4-hydroxyphenyl)propionate] (trade name: IRGANOX 259),
2,4-bis-(n-octylthio)-6-(4-hydroxy-3,5-di-t-butylanilino)-3,5-triadine (trade name: IRGANOX 565),
pentaerythrithyl-tetrakis[3-(3,5-di-t-butyl-4-hydroxyphenyl)propionate] (trade name: IRGANOX 1010),
2,2-thio-diethylene-bis[3-(3,5-di-t-butyl-4-hydroxyphenyl)propionate] (trade name: IRGANOX 1035),
octadecyl-3-(3,5-di-t-butyl-4-hydroxyphenyl)propionate) (trade name: IRGANOX 1076),
N,N-hexamethylenebis(3,5-di-t-butyl-4-hydroxy-hydrocinnamide) (trade name: IRGANOX 1098),
1,3,5-trimethyl-2,4,6-tris(3,5-di-t-butyl-4-hydroxybenzyl)benzene (trade name: IRGANOX 1330),
tris-(3,5-di-t-butyl-4-hydroxybenzyl)-isocyanurate (trade name: IRGANOX 3114) and
3,9-bis[2-[3-(3-t-butyl-4-hydroxy-5-methylphenyl)propionyl oxy]-1,1-dimethylethyl]-2,4,8,10-tetraoxaspiro[5.5]undecane (trade name: Sumilizer GA-80).

The hindered phenol compound may preferably be used in an amount of 0.01 to 10 parts by weight based on 100 parts by weight of the polyarylene having a sulfonic acid group.

(Process for Producing Proton Conductive Membrane)

The proton conductive membrane according to the present invention may be produced by dissolving the block copolymer in a casting solvent, and casting the resulting composition on a substrate followed by drying.

In the invention, the casting solvent contains an organic solvent that is not interactive with the ion conductive polymer segment (A).

Organic Solvent not Interactive with Ion Conductive Polymer Segment (A)

For use as the casting solvent for the production of the proton conductive membrane, the organic solvent not interactive with the ion conductive polymer segment (A) may be an organic solvent that does not contain a nitrogen-containing substituent in which the nitrogen atom is bonded by a single bond or a double bond. (Namely, the organic solvent is not an amine compound, amide compound, imide compound, diazo compound or the like.)

Examples of such solvents include methanol (pδ14.28), ethanol (δ 12.92), 1-propanol (δ 11.07), 2-propanol (δ 11.50), n-butyl alcohol (δ 11.30), 2-methyl-1-propanol (δ 11.11*), 1-pentanol (δ 10.96*), 2-pentanol (δ 10.77*), 3-pentanol (δ 10.77*), 2-methyl-1-butanol (δ 10.77*), 3-methyl-1-butanol (δ 10.77*), 2-methyl-2-butanol (δ 10.58*), 3-methyl-2-butanol (δ 10.58*), 2,2-dimethyl-1-propanol (δ 10.58*), cyclohexanol (δ 12.44*), dicyclohexanol (δ 10.95), 1-hexanol (δ 10.68*), 2-methyl-1-pentanol (δ 10.51*), 2-methyl-2-pentanol (δ 10.34*), 4-methyl-2-pentanol (δ 10.34*), 2-ethyl-1-butanol (δ 10.51*), 1-methylcyclohexanol (δ 11.76*), 2-methylcyclohexanol (δ 11.74*), 3-methylcyclohexanol (δ 11.74*), 4-methylcyclohexanol (δ 11.74*), 1-octanol (δ 10.28*), 2-octanol (δ 10.14*), 2-ethyl-1-hexanol (δ 10.14*), ethylene glycol (δ 16.30), propylene glycol (δ 14.80), 1,3-butanediol (δ 14.14), glycerol (δ 21.10), m-cresol (δ 11.11), diethylene glycol (δ 14.60), dipropylene glycol (δ 15.52), ethyl lactate (δ 10.57), n-butyl lactate (δ 9.68), diacetone alcohol (δ 10.18), dioxane (δ 10.0), butyl ether (δ 7.78*), phenyl ether (bp. 187° C., δ 12.16), isopentyl ether (δ 7.63*), dimethoxyethane (δ 7.63*), diethoxyethane (δ 7.85*), bis(2-methoxyethyl)ether (δ 8.10*), bis(2-ethoxyethyl)ether (δ 8.19*), cineol (δ 8.97*), benzyl ethylether (δ 9.20*), furan (δ 9.09), tetrahydrofuran (δ 9.52), anisole (δ 9.38*), phenetole (δ 9.27*), acetal (δ 7.65*), acetone δ 9.77), methyl ethyl ketone (δ 9.27), 2-pentanone (δ 8.30*), 3-pentanone (δ 8.30*), cyclopentanone (δ 12.81*), cyclohexanone (δ 9.88), 2-hexanone (δ 8.84*), 4-methyl-2-pentanone (δ 8.68*), 2-heptanone (δ 8.84*), 2,4-dimethyl-3-pentanone (δ 8.49), 2-octanone (δ 8.81*), acetophenone (δ 9.68), mesityl oxide (δ 9.20), benzaldehyde (δ 10.40), ethyl acetate (δ 9.10), n-butyl acetate (δ 8.46), isobutyl acetate (δ 8.42), sec-butyl acetate (δ 8.51*), isoamyl acetate (δ 8.32), pentyl acetate (δ 8.69*), isopentyl acetate (δ 8.52*), 3-methoxybutyl acetate (δ 8.52*), methyl butyrate (δ 8.72*), ethyl butyrate (δ 8.70*), methyl lactate (bp. 145° C., δ 12.42*), ethyl lactate (bp. 155° C., δ 10.57), butyl lactate (δ 11.26*), γ-butyrolactone (δ 12.78), 2-methoxyethanol (δ 11.98*), 2-ethoxyethanol (δ 11.47*), 2-(methoxymethoxy)ethanol (δ 11.60*), 2-isopropoxyethanol (δ 10.92*), 1-methoxy-2-propanol (δ 11.27*), 1-ethoxy-2-propanol (δ 10.92*), dimethyldiethylene glycol (δ 9.41), dimethyl sulfoxide (bp. 189° C., δ 12.93), dimethyl sulfone (δ 14.59), diethyl sulfide (δ 8.46), acetonitrile (δ 11.9), butyronitrile (δ 9.96), nitromethane (δ 12.30), nitroethane (δ 11.09), 2-nitropropane (δ 10.02), nitrobenzene (δ 10.62), benzene (δ 9.15), toluene (δ 8.91), xylene (δ 8.80), hexane (δ 7.24) and cyclohexane (δ 8.18).

These organic solvents may be used singly, or they may be used in combination, in which case preferably at least one of the solvents contains at least one group selected from —O—, —OH, —CO—, —SO$_2$—, —SO$_3$—, —CN and —COOR (where R is a hydrogen atom, a hydrocarbon group or a salt)

The organic solvent not interactive with the ion conductive polymer segment (A) desirably accounts for not less than 30% by weight, preferably not less than 60% by weight, more preferably not less than 90% by weight of the total solvent. This amount of the solvent reduces the influence of an organic solvent that interacts with the ion conductive polymer segment (A), and leads to a morphology of the membrane in which the ion conductive polymer segment (A) forms a continuous phase, whereby the ion conductive groups in the segment (A) are arranged uniformly through the membrane and can adsorb and bind thereto increased amounts of water, and consequently water is prevented from drying at low humidities and from freezing at low temperatures and the proton conductive membrane can achieve sufficient proton conductivity even at low humidities and low temperatures.

When the amount of the solvent is less than described above, an organic solvent that interacts with the ion conductive polymer segment (A) has a greater influence, and the membrane tends to have a morphology in which the ion conductive polymer segment (A) forms a non-continuous phase, whereby the ion conductive groups in the segment (A) are not arranged uniformly through the membrane and adsorb and bind thereto reduced amounts of water, and consequently the proton conductive membrane fails to achieve sufficient proton conductivity at low humidities and low temperatures.

In the above examples, the values indicated with a delta δ are the solubility parameters ((cal/mol)$^{1/2}$), and those followed by the symbol * are the values calculated by the Fedors method (R. F. Fedors, Polym. Eng. Sci., 14 [2] 147 (1974)).

One or more organic solvents not interactive with the ion conductive polymer segment (A) may be used, and the average solubility parameter is preferably in the range of 8.5 to 16 (cal/mol)$^{1/2}$, more preferably 10.0 to 14.0 (cal/mol)$^{1/2}$. When the average solubility parameter is outside this range, the solution viscosity is so high that the film production is difficult and the surface smoothness is often poor. The average solubility parameter is calculated by the following formula:

$$\delta_{Ave.} = \delta_1 x A_1/100 + \delta_2 x A_2/100 + \ldots + \delta_n x A_n/100$$

wherein:

$\delta_{Ave.}$: average solubility parameter $\delta_n$: solubility parameter of each solvent $A_n$: % by weight of each solvent relative to the organic solvents not interactive with the ion conductive polymer segment (A)

Examples of the organic solvents interactive with the ion conductive polymer segment (A) include basic organic solvents such as pyridine (δ 10.61), n-methyl-2-pyrrolidone (δ 11.17), 2-pyrrolidone (δ 13.88), dimethylacetamide (δ 11.12), tetramethylurea (δ 10.60) and dimethylformamide (δ 12.14). The amount of these solvents should be less than 30% (by volume) of the total solvent.

Composition

The composition for producing the proton conductive membrane includes the block copolymer and the organic solvent.

As described above, the organic solvent preferably contains not less than 30% (by volume relative to the total organic solvent) of the organic solvent not interactive with the ion conductive polymer segment (A).

In addition to the above components, the composition may contain inorganic acids such as sulfuric and phosphoric acids, organic acids including carboxylic acids, an appropriate amount of water, and the like.

Although the polymer concentration depends on the molecular weight of the block copolymer, it is generally from 5 to 40% by weight, preferably from 7 to 25% by weight. The polymer concentration less than 5% by weight causes difficulties in producing the membrane in large thickness and results in easy occurrence of pinholes. On the other hand, when the polymer concentration exceeds 40% by weight, the solution viscosity becomes so high that the film production is difficult and the surface smoothness is often poor.

The solution viscosity of the composition may vary depending on the type of the block copolymer and the polymer concentration. Generally, it ranges from 2,000 to 100,000 mPa·s, preferably from 3,000 to 50,000 mPa·s. When the viscosity is less than 2,000 mPa·s, the solution will have too high a fluidity and may spill out of the substrate during the membrane production. The viscosity exceeding 100,000 mPa·s is so high that the solution cannot be extruded through a die and the film-casting is difficult.

The composition for producing the proton conductive membrane may be prepared by mixing the aforesaid components in a predetermined ratio by conventional methods, for example by mixing with a mixer such as a wave rotor, a homogenizer, a disperser, a paint conditioner or a ball mill.

Production of Proton Conductive Membrane

The proton conductive membrane according to the invention may be produced by casting the composition on a substrate, followed by drying.

Specifically, the composition is cast over a substrate to form a film.

The substrate used herein may be a polyethyleneterephthalate (PET) film, but is not limited thereto. Any substrates commonly used in the solution casting methods may be employed. Examples include, but not particularly limited to, plastic substrates and metal substrates.

The film produced by the casting method is dried at 30 to 160° C., preferably 50 to 150° C., for 3 to 180 minutes, preferably 5 to 120 minutes. The dry thickness is generally from 10 to 100 μm, preferably 20 to 80 μm. When the solvent remains in the membrane after the drying, it may be removed by extraction with water as required.

The proton conductive membrane may be used as electrolytes for primary and secondary batteries, as proton conductive membranes for display elements, sensors, signaling media and solid condensers, and as ion exchange membranes.

In particular, (i) the membrane has a morphology including a microphase separated structure and (ii) the ion conductive polymer segment (A) forms a continuous phase, whereby the ion conductive groups in the segment (A) are arranged uniformly through the membrane and can adsorb and bind thereto increased amounts of water, and consequently water is prevented from drying at low humidities and from freezing at low temperatures and the membrane can achieve sufficient proton conductivity even at low humidities and low temperatures. Thus, the proton conductive membrane of the invention is suitable for use in hydrogen powered fuel cells for vehicles.

EXAMPLES

The present invention will be hereinafter described in greater detail by Examples presented below, but it should be construed that the invention is in no way limited to those Examples.

In Examples, the sulfonic acid equivalent, molecular weight, water content, and proton conductivity were determined as described below.

1. Sulfonic Acid Equivalent

The polymer having a sulfonic acid group was washed until the washings became neutral, and free residual acids were removed. The polymer was sufficiently washed with water and dried. A predetermined amount of the polymer was weighed out and dissolved in a THF/water mixed solvent. The resultant solution was mixed with phenolphthalein as an indicator, and the mixture was titrated with a NaOH standard solution to obtain a point of neutralization, from which the sulfonic acid equivalent was determined.

2. Measurement of Molecular Weight

The polyarylene having no sulfonic acid group was analyzed by GPC using tetrahydrofuran (THF) as a solvent to determine the weight-average molecular weight in terms of polystyrene. The polyarylene having a sulfonic acid group was analyzed by GPC using an eluting solution consisted of N-methyl-2-pyrrolidone (NMP) mixed with solvents lithium bromide and phosphoric acid, to determine the molecular weight in terms of polystyrene.

3. Measurement of Water Content in Membrane

The proton conductive membrane film was cut to 2 cm×3 cm, and was measured for initial weight. The film and water were placed in a Teflon™ bottle, and the film was soaked at 120° C. for 24 hours using a pressure cooker tester (HIRAYAMA MANUFACTURING CORPORATION). The film was taken out, and the water droplets on the surface were towel dried. The film was weighed to determine the water content in the membrane (%).

Water content in membrane (%)=(Soaked film weight (g)−Initial weight (g))/Initial weight (g)×100

4. Measurement of Proton Conductivity

A 5 mm wide strip specimen of the proton conductive membrane, holding five platinum wires (ϕ=0.5 mm) at intervals of 5 mm on its surface, was placed in a thermo-hygrostat. The alternating current impedance between the platinum wires was measured at 10 kHz under the conditions of 85° C. and 45% RH and under the conditions of temperatures of 25° C., 5° C., 0° C., −10° C. and −20° C. and 50% RH. This measurement was carried out using a chemical impedance measuring system (NF Corporation) and thermo-hygrostat JW241 (Yamato Science Co., Ltd.). The alternating current resistance was measured in each case where the interwire distance was changed from 5 mm to 20 mm among the five platinum wires. The resistivity of the membrane was calculated from a gradient between the interwire distance and the resistance. The reciprocal number of resistivity was obtained as alternating current impedance, from which the proton conductivity was calculated.

Resistivity R (Ω·cm)=0.5 (cm)×membrane thickness (cm)×resistance/interwire distance gradient (Ω/cm)

Synthetic Example 1

(Preparation of Oligomer)

A 1-L three-necked flask equipped with a stirrer, a thermometer, a cooling tube, a Dean-Stark tube and a three-way nitrogen inlet tube, was charged with 67.3 g (0.20 mol) of 2,2-bis(4-hydroxyphenyl)-1,1,1,3,3,3-hexafluoropropane (bisphenol AF), 60.3 g (0.24 mol) of 4,4'-dichlorobenzophenone (4,4'-DCBP), 71.9 g (0.52 mol) of potassium carbonate, 300 ml of N,N-dimethylacetamide (DMAc) and 150 ml of toluene. With the flask in an oil bath, the materials were reacted by being stirred in a nitrogen atmosphere at 130° C. The reaction was carried out while water resulting from the reaction was formed into an azeotropic mixture with toluene and was removed outside the system through the Dean-Stark tube. Water almost ceased to occur after about 3 hours, and most of the toluene was removed while gradually raising the reaction temperature from 130° C. to 150° C. The reaction was continuously performed at 150° C. for 10 hours, and 10.0 g (0.040 mol) of 4,4'-DCBP was added to carry out the reaction for another 5 hours. The reaction liquid was cooled naturally and was filtered to remove precipitated by-product inorganic compounds. The filtrate was poured into 4 L of methanol to precipitate the product. The precipitated product was filtered off, dried and dissolved in 300 ml of tetrahydrofuran. The resultant solution was poured into 4 L of methanol to perform reprecipitation. Consequently, 95 g of an objective compound was obtained (85% yield).

GPC (THF solvent) showed that the polymer had a weight-average molecular weight of 11,200 in terms of polystyrene. The polymer was found to be soluble in THF, NMP, DMAc and sulfolane, and to have Tg of 110° C. and a thermal decomposition temperature of 498° C.

The compound obtained was identified to be an oligomer represented by Formula (I) (hereinafter, the BCPAF oligomer)

[Chem. 21]

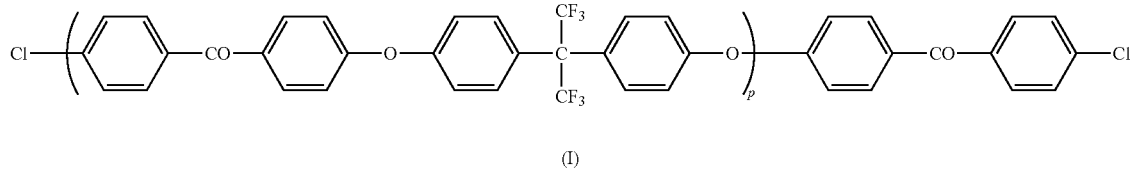

(I)

Synthetic Example 2

Preparation of neopentyl-protected polyarylene copolymer

A 1-L three-necked flask equipped with a stirrer, a thermometer, a cooling tube, a Dean-Stark tube and a three-way nitrogen inlet tube, was charged, in a nitrogen atmosphere, with 39.58 g (98.64 mmol) of neo-pentyl 3-(2,5-dichlorobenzoyl)benzenesulfonate, 15.23 g (1.36 mmol) of the BCPAF oligomer (Mn=11,200) obtained in Synthetic Example 1, 1.67 g (2.55 mmol) of Ni(PPh$_3$)$_2$Cl$_2$, 10.49 g (40 mmol) of PPh$_3$, 0.45 g (3 mmol) of NaI, 15.69 g (240 mmol) of zinc powder and 390 ml of dry NMP. The reaction system was heated (finally to 75° C.) with stirring to perform reaction for 3 hours. The polymerization solution was diluted with 250 ml of THF, stirred for 30 minutes, and filtered with use of Celite as a filter aid. The filtrate was poured into large excess (1500 ml) of methanol to precipitate the product. The precipitated product was filtered off, air dried, redissolved in THF/NMP (200/300 ml) and precipitated in large excess (1500 ml) of methanol. The precipitated product was air dried and then heat dried to give 47.0 g (99% yield) of an objective yellow fibrous copolymer including a neopentyl-protected sulfonic acid derivative. GPC resulted in Mn of 47,600 and Mw of 159,000.

A 5.1 g portion of the copolymer was dissolved in 60 ml of NMP, followed by heating to 90° C. To the reaction system, a mixture consisting of 50 ml of methanol and 8 ml of concentrated hydrochloric acid was added all at once. Reaction was carried out under mild reflux conditions for 10 hours while maintaining a suspension state. Excess methanol was evaporated using a distillation apparatus equipped, and a light green transparent solution resulted. The solution was poured into an excess of water/methanol (1:1 by weight) to precipitate the polymer. The polymer was washed with ion exchange water until the pH of the washings became not less than 6. IR spectroscopy and quantitative analysis for ion exchange capacity showed that the sulfonate groups (—SO$_3$R$^a$) had been quantitatively converted to the sulfonic acid groups (—SO$_3$H). The polymer had a structure represented by Formula (II) below.

GPC for the polyarylene copolymer having a sulfonic acid group resulted in Mn of 53,200 and Mw of 185,000. The sulfonic acid equivalent was 1.9 meq/g.

toluene was removed outside the reaction system through the Dean-Stark tube. The reaction temperature was slowly raised to 200° C. and stirring was performed for 3 hours. Thereafter, 9.2 g (53 mmol) of 2,6-dichlorobenzonitrile was added to carry out the reaction for another 5 hours.

The reaction liquid was cooled naturally, diluted with 100 ml of toluene, and filtered to remove insoluble inorganic salts. The filtrate was poured into 2 L of methanol to precipitate the product. The precipitated product was filtered off, dried and dissolved in 250 ml of tetrahydrofuran. The resultant solution was poured into 2 L of methanol to perform reprecipitation. The precipitated white powder was filtered off and dried to yield 109 g of an objective product. GPC resulted in a number-average molecular weight (Mn) of 9,500.

The compound obtained was identified to be an oligomer represented by Formula (III):

[Chem. 23]

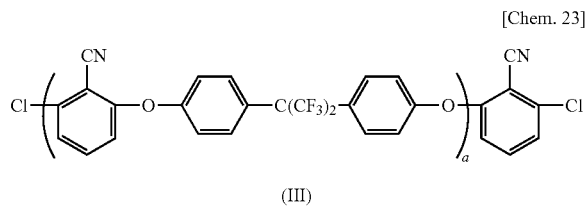

(III)

Synthetic Example 4

Synthesis of Sulfonated Polyarylene

A 1-L three-necked flask equipped with a stirrer, a thermometer and a nitrogen inlet tube was charged with 135.2 g (337 mmol) of neopentyl 3-(2,5-dichlorobenzoyl) benzenesulfonate, 48.7 g (5.1 mmol) of the oligomer of Formula (III)

[Chem. 22]

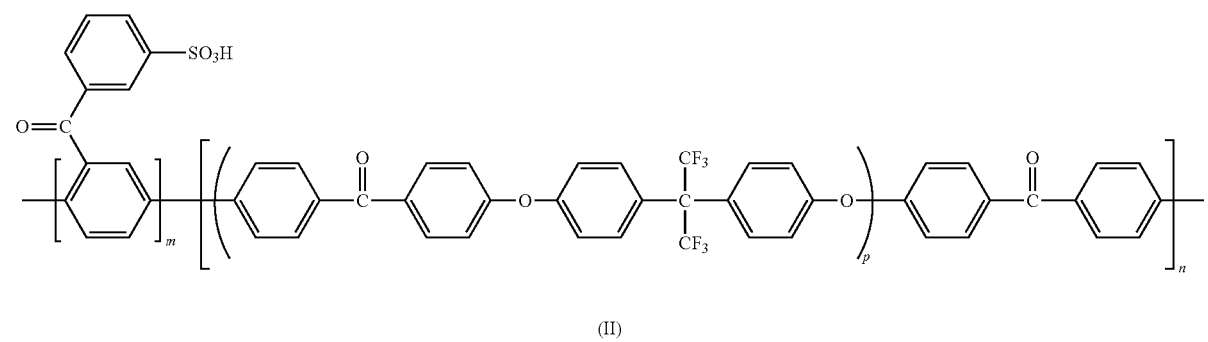

(II)

Synthetic Example 3

(1) Synthesis of Oligomer

A 1-L three-necked flask equipped with a stirrer, a thermometer, a Dean-Stark tube, a nitrogen inlet tube and a cooling tube, was charged with 48.8 g (284 mmol) of 2,6-dichlorobenzonitrile, 89.5 g (266 mmol) of 2,2-bis(4-hydroxyphenyl)-1,1,1,3,3,3-hexafluoropropane, and 47.8 g (346 mmol) of potassium carbonate. After the flask had been purged with nitrogen, 346 ml of sulfolane and 173 ml of toluene were added, followed by stirring. The reaction liquid was heated at 150° C. under reflux in an oil bath. Water resulting from the reaction was trapped in the Dean-Stark tube. Water almost ceased to occur after 3 hours, and the obtained in Synthetic Example 3 (Mn=9,500), 6.71 g (10.3 mmol) of bis(triphenylphosphine)nickel dichloride, 1.54 g (10.3 mmol) of sodium iodide, 35.9 g (137 mmol) of triphenylphosphine, and 53.7 g (821 mmol) of zinc. The flask was purged with dry nitrogen, and 430 ml of N,N-dimethylacetamide (DMAc) was added. The mixture was stirred for 3 hours while maintaining the reaction temperature at 80° C. The reaction liquid was diluted with 730 ml of DMAc, and insolubles were filtered out.

The solution obtained was introduced into a 2-L three-necked flask equipped with a stirrer, a thermometer and a nitrogen inlet tube, and was heated to 115° C. with stirring. Subsequently, 44 g (506 mmol) of lithium bromide was added. The mixture was stirred for 7 hours and was poured into 5 L of acetone to precipitate the product. The product was washed sequentially with 1N hydrochloric acid and pure water, and was dried to give 122 g of an objective polymer. The weight-average molecular weight (Mw) of the polymer was 135,000. The polymer obtained was assumed to be a sulfonated polymer represented by Formula (IV). The ion exchange capacity of the polymer was 2.3 meq/g.

[Chem. 24]

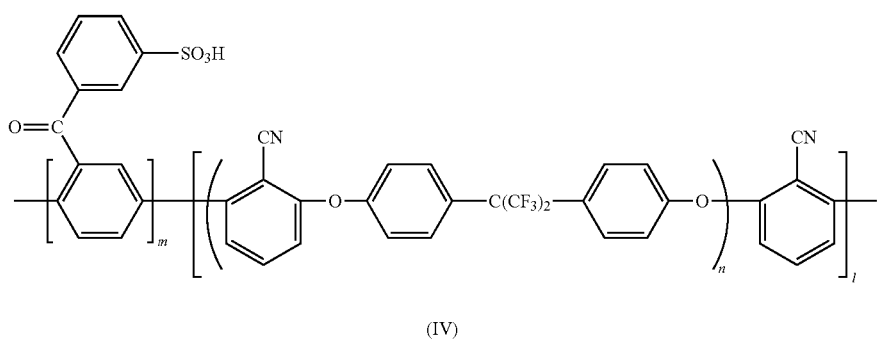

(IV)

Example 1

A 50-cc screw cap tube was charged with 4 g of the sulfonic acid-containing polyarylene obtained in Synthetic Example 2, 11.7 g of 1-methoxy-2-propanol and 17.6 g of γ-butyrolactone, followed by stirring with a wave rotor for 24 hours. Consequently, a uniform polymer solution having a viscosity of 5,000 cp resulted.

The solution was cast on a PET film using a bar coater, and the coating was dried at 80° C. for 30 minutes and at 120° C. for 60 minutes to give a uniform and transparent solid electrolyte film A having a thickness of 40 μm. For observation of the internal structure of the film, an ultrathin piece was cut out from the film and was stained with lead nitrate. The piece was observed with transmission electron microscope (hereinafter TEM) HF-100FA manufactured by Hitachi, Ltd.

The TEM observation showed an isotropic microphase separated structure formed by domains of the polymer segments (A) with ion conductive groups and domains of the polymer segments (B) without ion conductive groups. (See FIG. 1.)

In the co-continuous structure shown in FIG. 1, the domains of the segments (B) formed non-continuous domains, and the domains of the segments (A) constituted matrixes and linked together to form a continuous network through the membrane. Analysis of the TEM picture with an image processing software (scion image) resulted in a long period of 23 nm.

The film obtained was evaluated for water content and proton conductivity by the above methods. The results are given in Tables 1 and 2.

Example 2

A 50-cc screw cap tube was charged with 4 g of the sulfonic acid-containing polyarylene obtained in Synthetic Example 2, 11.7 g of 1-methoxy-2-propanol, 8.8 g of toluene and 8.8 g of γ-butyrolactone, followed by stirring with a wave rotor for 24 hours. Consequently, a uniform polymer solution having a viscosity of 4,500 cp resulted.

The solution was cast on a PET film using a bar coater, and the coating was dried at 80° C. for 30 minutes and at 120° C. for 60 minutes to give a uniform and transparent solid electrolyte film B having a thickness of 38 μm. For observation of the internal structure of the film, an ultrathin piece was cut out from the film and was stained with lead nitrate. The piece was observed with transmission electron microscope (hereinafter TEM) HF-100FA manufactured by Hitachi, Ltd.

The TEM observation showed an isotropic microphase separated structure formed by domains of the polymer segments (A) with ion conductive groups and domains of the polymer segments (B) without ion conductive groups. The microphase separated structure was clearer than that of Example 1, and the domains of the segments (B) formed non-continuous domains similar to dispersed phases, and the domains of the segments (A) constituted matrixes and linked together to form a continuous network through the membrane. Analysis of the TEM picture with an image processing software (scion image) resulted in a long period of 25 nm.

The film obtained was evaluated for water content and proton conductivity by the above methods. The results are given in Tables 1 and 2.

Example 3

A 50-cc screw cap tube was charged with 4 g of the sulfonic acid-containing polyarylene obtained in Synthetic Example 4, 14.4 g of 1-methoxy-2-propanol and 21.6 g of γ-butyrolactone, followed by stirring with a wave rotor for 24 hours. Consequently, a uniform polymer solution having a viscosity of 7,000 cp resulted.

The solution was cast on a PET film using a bar coater, and the coating was dried at 80° C. for 30 minutes and at 120° C. for 60 minutes to give a uniform and transparent solid electrolyte film A having a thickness of 40 μm. For observation of the internal structure of the film, an ultrathin piece was cut out from the film and was stained with lead nitrate. The piece was observed with transmission electron microscope (hereinafter TEM) HF-100FA manufactured by Hitachi, Ltd.

The TEM observation showed an isotropic microphase separated structure formed by domains of the polymer segments (A) with ion conductive groups and domains of the polymer segments (B) without ion conductive groups.

In the co-continuous structure, the domains of the segments (B) formed non-continuous domains, and the domains of the segments (A) constituted matrixes and linked together to form a continuous network through the membrane. Analysis of the TEM picture with an image processing software (scion image) resulted in a long period of 20 nm.

The film obtained was evaluated for water content and proton conductivity by the above methods. The results are given in Tables.

Comparative Example 1

A 50-cc screw cap tube was charged with 4 g of the sulfonic acid-containing polyarylene obtained in Synthetic Example 2 and 29.3 g of N-methyl-2-pyrrolidone, followed by stirring with a wave rotor for 24 hours. Consequently, a uniform polymer solution having a viscosity of 4,000 cp resulted.

The solution was cast on a PET film using a bar coater, and the coating was dried at 80° C. for 30 minutes and at 140° C. for 60 minutes to give a uniform and transparent solid electrolyte film C having a thickness of 40-m. For observation of the internal structure of the film, an ultrathin piece was cut out from the film and was stained with lead nitrate. The piece was observed with transmission electron microscope (hereinafter TEM) HF-100FA manufactured by Hitachi, Ltd.

The TEM observation showed an isotropic microphase separated structure formed by domains of the polymer segments (A) with ion conductive groups and domains of the polymer segments (B) without ion conductive groups. To the contrary of the co-continuous structure shown in FIG. 1, the domains of the segments (B) formed more non-continuous domains, and the domains of the segments (A) linked together to form a continuous network through the membrane. Analysis of the TEM picture with an image processing software (scion image) resulted in a long period of 30 nm.

The film obtained was evaluated for water content and proton conductivity by the above methods. The results are given in Tables.

Comparative Example 2

A 50-cc screw cap tube was charged with 4 g of the sulfonic acid-containing polyarylene obtained in Synthetic Example 2, 2.9 g of water, 21.7 g of dimethoxyethane and 4.7 g of 2-propanol, followed by stirring with a wave rotor for 24 hours. Consequently, a uniform polymer solution having a viscosity of 11,000 cp resulted.

The solution was cast on a PET film using a bar coater, and the coating was dried at 80° C. for 30 minutes and at 120° C. for 60 minutes to give a uniform and transparent solid electrolyte film D having a thickness of 39 μm. For observation of the internal structure of the film, an ultrathin piece was cut out from the film and was stained with lead nitrate. The piece was observed with transmission electron microscope (hereinafter TEM) HF-100FA manufactured by Hitachi, Ltd.

The TEM observation showed a disordered structure without microphase separation of domains of the polymer segments (A) with ion conductive groups and domains of the polymer segments (B) without ion conductive groups.

The solid electrolyte film D was broken during the water content measurement, proving bad resistance to hot water. The measurement of proton conductivity was canceled.

TABLE 1

| Polymer | Weight ratio of solvents (%) | Water content (%) (120° C. water × 24 hr) |
|---|---|---|
| Ex. 1 | Syn. Ex. 2 | 1-methoxy-2-propanol/γ-butyrolactone (40/60) | 200 |
| Ex. 2 | Syn. Ex. 2 | 1-methoxy-2-propanol/toluene/γ-butyrolactone (40/30/30) | 240 |
| Ex. 3 | Syn. Ex. 4 | 1-methoxy-2-propanol/γ-butyrolactone (40/60) | 130 |
| Comp. Ex. 1 | Syn. Ex. 2 | N-methyl-2-pyrrolidone (100) | 170 |
| Comp. Ex. 2 | Syn. Ex. 2 | Water/dimethoxyethane/2-propanol (10/74/16) | Broken membrane |

TABLE 2

| | Conductivity (Ω · cm) | | | | | |
|---|---|---|---|---|---|---|
| | 85° C./45% | 25° C./50% | 5° C./50% | 0° C./50% | −10° C./50% | −20° C./50% |
| Ex. 1 | $2.3 \times 10^{-2}$ | $1.6 \times 10^{-2}$ | $8.7 \times 10^{-3}$ | $8.9 \times 10^{-3}$ | $5.3 \times 10^{-3}$ | $3.5 \times 10^{-3}$ |
| Ex. 2 | $2.5 \times 10^{-2}$ | $1.7 \times 10^{-2}$ | $8.9 \times 10^{-3}$ | $9.1 \times 10^{-3}$ | $5.6 \times 10^{-3}$ | $3.8 \times 10^{-3}$ |
| Ex. 3 | $2.7 \times 10^{-2}$ | $1.8 \times 10^{-2}$ | $8.9 \times 10^{-3}$ | $9.2 \times 10^{-3}$ | $6.0 \times 10^{-3}$ | $4.1 \times 10^{-3}$ |
| Comp. Ex. 1 | $1.7 \times 10^{-2}$ | $1.2 \times 10^{-2}$ | $6.1 \times 10^{-3}$ | $5.4 \times 10^{-3}$ | $2.6 \times 10^{-3}$ | $1.6 \times 10^{-3}$ |
| Comp. Ex. 2 | Canceled | Canceled | Canceled | Canceled | Canceled | Canceled |

The invention claimed is:

1. A proton conductive membrane comprising:
   a block polyarylene-copolymer comprising an ion conductive polymer segment (A) and an ion nonconductive polymer segment (B), the segment (A) and the segment (B) being covalently bound in a manner such that main chain skeletons of the segments are covalently bound at aromatic rings thereof through binding groups,
   (i) the membrane having a morphology comprising a microphase separated structure,
   (ii) the ion conductive polymer segment (A) forming a continuous phase,
   wherein the block polyarylene-copolymer has a structure in which main chain skeletons of the copolymer are covalently bound at aromatic rings thereof through binding groups.

2. The proton conductive membrane according to claim 1, wherein the block polyarylene-copolymer comprises the polymer segments (A) and (B) that comprise repeating structural units represented by Formulae (A) and (B), respectively:

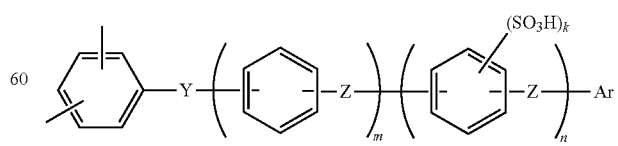

wherein Y is a divalent electron-withdrawing group; Z is a divalent electron-donating group or a direct bond; Ar is an aromatic group having a substituent —$SO_3H$; m is an integer ranging from 0 to 10; n is an integer ranging from 0 to 10; and k is an integer ranging from 1 to 4;

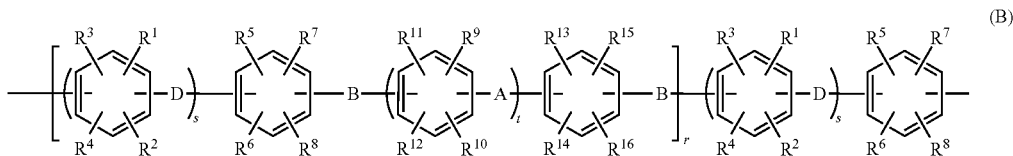

wherein A and D are each a direct bond or at least one structure selected from the group consisting of —CO—, —SO$_2$—, —SO—, —CONH—, —COO—, —(CF$_2$)$_l$— (wherein l is an integer ranging from 1 to 10), —(CH$_2$)$_l$— (wherein l is an integer ranging from 1 to 10), —C(R')$_2$— (wherein R' is an alkyl group, a fluoroalkyl group or an aryl group), —O—, —S—, cyclohexylidene group and fluorenylidene group; B's are each an oxygen or a sulfur atom; R$^1$ to R$^{16}$ are the same or different from one another and are each at least one atom or group selected from the group consisting of a hydrogen atom, a fluorine atom, alkyl groups, partially or fully halogenated alkyl groups, allyl groups, aryl groups, nitro group and nitrile group; s and t are the same or different and are each an integer ranging from 0 to 4; and r is an integer of 0 or 1 or greater.

3. The proton conductive membrane according to claim 1 or 2, wherein the ion conductive polymer segment has a sulfonic acid group.

4. A process for producing a proton conductive membrane as described claim 1, which process comprises dissolving a block polyarylene-copolymer in a casting solvent to form a solution, wherein the block polyarylene-copolymer comprises an ion conductive polymer segment (A) and an ion nonconductive polymer segment (B) that are covalently bound to each other,
casting the solution over a substrate, and
drying,
wherein the casting solvent comprises at least 30% by weight of an organic solvent that is not interactive with the ion conductive polymer segment (A).

5. The process for producing a proton conductive membrane according to claim 4, wherein the organic solvent that is not interactive with the ion conductive polymer segment (A) (i) does not comprise a nitrogen comprising substituent in which the nitrogen atom is bonded by a single bond or a double bond, and (ii) comprises at least one group selected from the group consisting of —O—, —OH, —CO—, —SO$_2$—, —SO$_3$—, —CN, and —COOR; wherein R is a hydrogen atom, a hydrocarbon group or a salt.

6. The proton conductive membrane of claim 2, wherein in Formula (A), Z is a direct bond.

7. The proton conductive membrane of claim 2, wherein in Formula (A), Z is a divalent electron-donating group.

8. The proton conductive membrane of claim 7, wherein divalent electron-donating group Z in Formula (A) is selected from the group consisting of —(CH$_2$)—, —C(CH$_3$)$_2$—, —O—, —S—, —CH=CH—, —C≡C—,

9. The proton conductive membrane of claim 2, wherein Ar, in the aromatic group Ar having a substituent —SO$_3$H, in Formula (A), is selected from the group consisting of phenyl, naphthyl, anthracenyl, and phenanthyl.

10. The proton conductive membrane of claim 9, wherein Ar is phenyl.

11. The proton conductive membrane of claim 9, wherein Ar is naphthyl.

12. The proton conductive membrane of claim 2, wherein in the Formula (B), A and D are each a direct bond.

13. The process of claim 5, wherein the organic solvent that is not interactive with the ion conductive polymer segment (A) comprises —O—.

14. The process of claim 5, wherein the organic solvent that is not interactive with the ion conductive polymer segment (A) comprises —OH.

15. The process of claim 5, wherein the organic solvent that is not interactive with the ion conductive polymer segment (A) comprises —CO—.

16. The process of claim 5, wherein the organic solvent that is not interactive with the ion conductive polymer segment (A) comprises —SO$_2$—.

17. The process of claim 5, wherein the organic solvent that is not interactive with the ion conductive polymer segment (A) comprises —CN.

18. The process of claim 5, wherein the organic solvent that is not interactive with the ion conductive polymer segment (A) comprises —COOR, wherein R is a hydrogen atom.

19. The process of claim 5, wherein the organic solvent that is not interactive with the ion conductive polymer segment (A) comprises —COOR, wherein R is a hydrocarbon group.

20. The process of claim 5, wherein the organic solvent that is not interactive with the ion conductive polymer segment (A) comprises —COOR, wherein R is a hydrogen atom, a hydrocarbon group or a salt.

* * * * *